US010936766B2

(12) United States Patent
Yang et al.

(10) Patent No.: US 10,936,766 B2
(45) Date of Patent: Mar. 2, 2021

(54) TECHNIQUES FOR PARALLEL EXECUTION OF RANSAC ALGORITHM

(71) Applicant: INTEL CORPORATION, Santa Clara, CA (US)

(72) Inventors: Liu Yang, Beijing (CN); Qiang Li, Beijing (CN); Bin Wang, Beijing (CN); Xianchao Xu, Beijing (CN); Bing Niu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 15/129,816

(22) PCT Filed: Mar. 27, 2014

(86) PCT No.: PCT/CN2014/074179
§ 371 (c)(1),
(2) Date: Sep. 27, 2016

(87) PCT Pub. No.: WO2015/143661
PCT Pub. Date: Oct. 1, 2015

(65) Prior Publication Data
US 2017/0140078 A1    May 18, 2017

(51) Int. Cl.
*G06F 17/18*    (2006.01)
*G06F 30/20*    (2020.01)
(Continued)

(52) U.S. Cl.
CPC .............. *G06F 30/20* (2020.01); *G06F 17/18* (2013.01); *G06F 30/00* (2020.01); *G06T 7/35* (2017.01); *G06F 2111/10* (2020.01)

(58) Field of Classification Search
CPC .......... G06F 17/50; G06F 30/20; G06F 30/00; G06F 17/18; G06F 2111/10; G06T 7/35
(Continued)

(56) References Cited

U.S. PATENT DOCUMENTS 8,848,975 B2 *  9/2014  Tell ................... G06K 9/00208
                                                  382/103
9,582,518 B2 *  2/2017  Shiiyama ............ G06F 16/434
(Continued)

FOREIGN PATENT DOCUMENTS

CN        101442619 A       5/2009
CN        102169581 A       8/2011
(Continued)

OTHER PUBLICATIONS

Extended European Search Report received for European Patent Application No. 14886965.4, dated Dec. 6, 2017, 9 pages.
(Continued)

*Primary Examiner* — Thai Q Phan
(74) *Attorney, Agent, or Firm* — Compass IP Law, PC

(57) ABSTRACT

Various embodiments are generally directed to techniques for employing a hybrid of sequential and parallel processing to perform random sample and consensus (RANSAC). A device to perform RANSAC includes a derivation component to derive a first set of proposed models in parallel from a first set of minimal sample sets of a data set; and a comparison component to recalculate a required quantity of proposed models to derive an accurate model if a proposed model of the first set of proposed models better fits the data set than any proposed model derived prior to derivation of the first set of proposed models, and to determine whether to derive a second set of proposed models following derivation of the first set of proposed models based on a comparison of the required quantity to a quantity of previously derived proposed models that includes the first set. Other embodiments are described and claimed.

20 Claims, 14 Drawing Sheets

(51) Int. Cl.
*G06T 7/35* (2017.01)
*G06F 30/00* (2020.01)
*G06F 111/10* (2020.01)

(58) Field of Classification Search
USPC .............. 703/2, 5; 345/42, 47; 709/201
See application file for complete search history.

(56) References Cited

U.S. PATENT DOCUMENTS

| | | | |
|---|---|---|---|
| 2009/0263009 A1 | 10/2009 | Krishnaswamy et al. | |
| 2009/0304236 A1* | 12/2009 | Francini ................. | G06T 17/05 382/109 |
| 2009/0324018 A1* | 12/2009 | Tell ..................... | G06K 9/00208 382/103 |
| 2010/0042563 A1 | 2/2010 | Livingston et al. | |
| 2011/0052043 A1 | 3/2011 | Hyung et al. | |
| 2013/0124147 A1 | 5/2013 | Jin | |
| 2015/0199572 A1* | 7/2015 | Kim .................... | G06K 9/00624 382/103 |

(56) References Cited

FOREIGN PATENT DOCUMENTS

| | | |
|---|---|---|
| CN | 103310122 A | 9/2013 |
| JP | 05258058 A | 8/1993 |
| WO | 2013128343 | 9/2013 |

OTHER PUBLICATIONS

Khalili et al., "Fast Parallel Model Estimation on the Cell Broadband Engine", Network and parallel Computing, Dec. 2012, 12 pages.
Fijany et al., "Image Processing Applications on a Low Power Highly Parallel SIMD Architecture", IEEE Aerospace Conference, Mar. 5, 2011, 12 pages.
International Search Report, dated Dec. 31, 2014, Application No. PCT/CN2014/074179, Filed Date: Mar. 27, 2014, pp. 3.
Miyatake, Takahisa, "Optimal Digital Line Fitting Using Multiresolutional Representation" Apr. 19, 2012, Information Processing Society of Japan, 119 pages.
Office Action received for Japanese Patent Application No. 2016-551778, dated Nov. 7, 2017, 13 pages English translation.
Raguram et al., "USAC: A Universal Framework for Random Sample Consensus", IEEE Transactions on Pattern Analysis and Machine Intelligence, Aug. 2013, vol. 35, Issue 8, 16 pages.

* cited by examiner

TECHNIQUES FOR PARALLEL EXECUTION OF RANSAC ALGORITHM

CROSS-REFERENCE TO RELATED APPLICATIONS

This application is a national stage application claiming the benefit of and priority to International Application No. PCT/CN2014/074179 entitled "TECHNIQUES FOR PARALLEL EXECUTION OF RANSAC ALGORITHM" filed Mar. 27, 2014, which is hereby incorporated by reference in its entirety.

BACKGROUND

It has become commonplace to employ various estimation algorithms to derive mathematical models from large data sets representing any of a variety of types of data in various areas, including analysis of dynamic forces, simulations of gaseous or fluid movement, thermal analysis, image processing, etc. In the area of image processing, such data sets may be derived from visual imagery, and such estimation algorithms may be employed to derive relationships between portions of images from more than one camera as part of processes for identifying objects.

Unfortunately, while there are numerous algorithms for deriving models from data sets that are relatively free of "outliers" (e.g., elements of data sets that represent statistical anomalies), there are relatively few algorithms that have proven effective in deriving models from data sets that may have a relatively high proportion of such outliers with a relatively high degree of certainty. Stated differently, there are relatively few algorithms for deriving models from relatively "noisy" data in which as much as 50% of the elements in a data set may be noise that does not represent real information.

Among those few algorithms is random sample and consensus (RANSAC), an iterative algorithm in which proposed models are repeatedly generated and tested to find a proposed model that best fits the data elements of the data set to a predetermined degree of probability. RANSAC is typically performed entirely in a sequential manner such that in each iteration a single subset of randomly selected elements of the data set is generated, a single proposed model is derived from that subset, that proposed model is tested, a determination is made as to whether that proposed model is a better fit to the data set than all others from previous iterations, and a determination is made as to whether further iterations are required. If the newly derived and tested proposed model is a better fit than all others from previous iterations, it then becomes the new overall best proposed model, and the total number of iterations required is recalculated based at least partly on the degree to which the new overall best proposed model fits the data set. The number of iterations performed so far is then compared to the total number required (whether recalculated or not) to determine whether another iteration is to be performed.

Depending on the complexity of the proposed models, the derivation and testing of each proposed model can consume considerable processing, storage and/or power resources, as well as consuming a considerable amount of time. Further, the recurring performance of the calculation to determine whether further iterations are required can also consume considerable resources and/or time.

DETAILED DESCRIPTION

Figure 1:
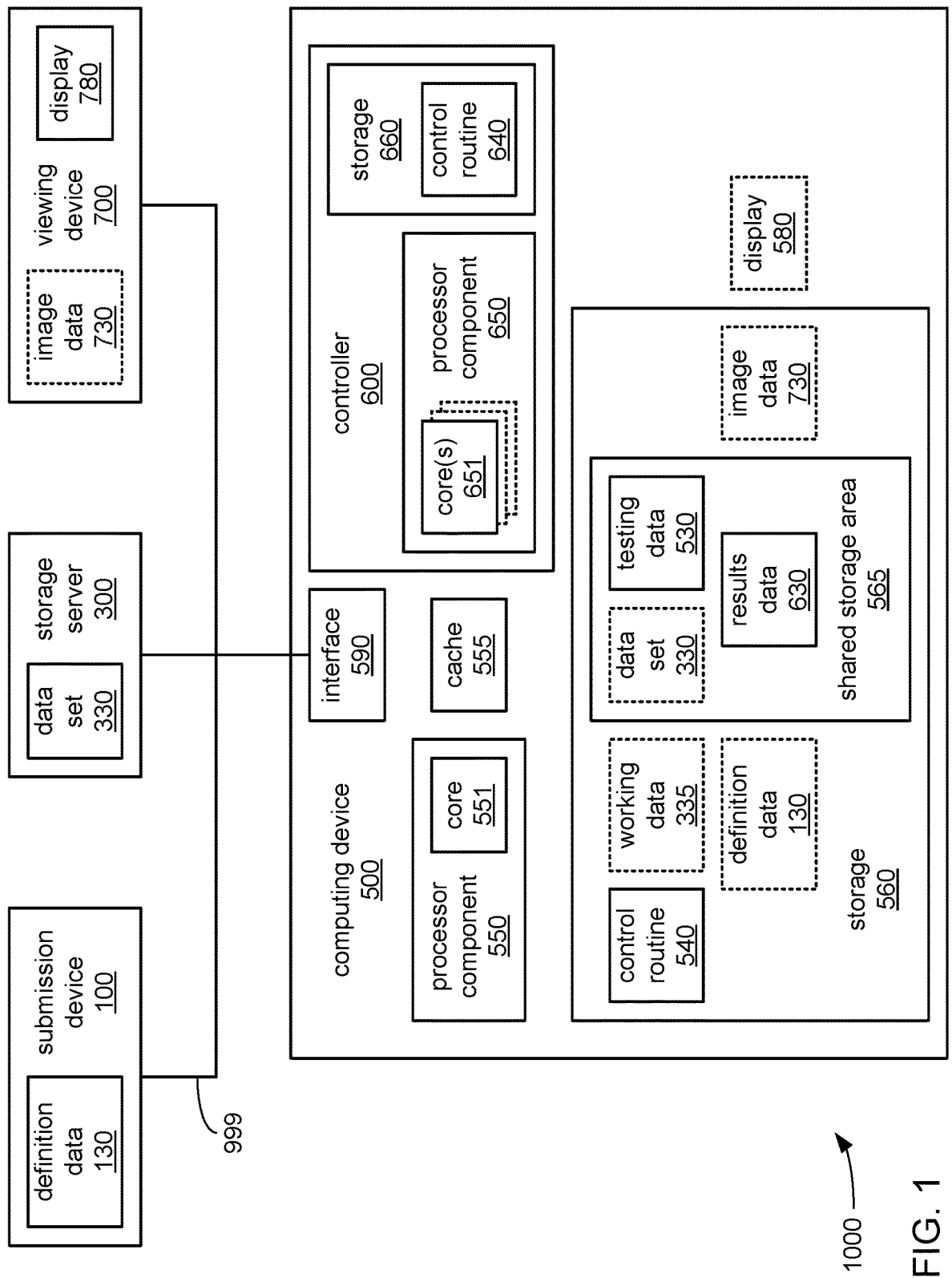
FIG. 1 illustrates an embodiment of a model processing system.

Various embodiments are generally directed to techniques for employing a hybrid of sequential and parallel processing to perform the random sample and consensus (RANSAC) algorithm. The generation of subsets of a data set from which proposed models are derived may be performed sequentially. However, sets of multiple proposed models are derived and tested in parallel. Further, the determination of which proposed model best fits the data set, the calculation of the number of proposed models that must be derived and tested, and the determination of whether to derive and test more proposed models, though performed sequentially, are performed less frequently. The performance of some portions in parallel and the reduced frequency with which other portions are performed sequentially reduces the time required to perform RANSAC. The portions that are performed in parallel may be performed by one or more cores of one or more processor components that differ in architecture from the single core and/or the single processor component that performs the sequential portions.

In essence, what occurs in performing an iteration of RANSAC is redefined from what occurs in each iteration of the longstanding typical fully sequential approach to performing RANSAC. In each such redefined iteration, multiple subsets of the data set are generated, and a new set of proposed models are derived and tested. Following the derivation and testing of each new set of proposed models, the one proposed model of the new set that best fits the data set is compared to the proposed model previously determined to be the overall best fit among all of the proposed models of all the previously derived and tested sets. If the best fitting proposed model of the new set is a better fit to the data set than the overall best proposed model from all previous sets of proposed models, then the best fitting proposed model of the new set becomes the new overall best proposed model. If the best fitting proposed model of the new set becomes the new overall best proposed model, then the total number of proposed models that need to be derived and tested is recalculated based at least partly on the degree to which the new overall best proposed model fits the data set. The number of proposed models derived and tested so far is then compared to the number of proposed models that need to be derived and tested (whether recalculated or not) to determine whether another iteration of deriving and testing another set of proposed models is to be performed. At the point where it is determined that no more sets of proposed models are to be derived and tested, whatever proposed model is the overall best proposed model becomes the model derived by the performance of RANSAC.

Portions of the RANSAC algorithm that are performed sequentially may be performed by a single core of one processor component. That core of that processor component may be selected based on having one or more characteristics causing it to be better suited to performing those portions in a sequential manner, including and not limited to, performing probability calculations. Other portions of the RANSAC algorithm that are performed in parallel may be performed by one or more other cores of either the same processor component or a different processor component. The one or more other cores may be selected based on having one or more characteristics causing the one or more other cores to be better suited to performing those portions in parallel, including and not limited to a capability to execute multiple threads and/or to perform single-instruction multiple-data (SIMD) parallel processing of data.

In some embodiments, the core employed in performing portions of RANSAC in a sequential manner may be of a central processing unit (CPU) of a computing device, and the one or more other cores employed in performing other portions of RANSAC in a parallel manner may be of a graphics processing unit (GPU) of that computing device. The CPU and GPU may be implemented on the same semiconductor die within the same processor component of the computing device. Alternatively, the CPU and GPU may be implemented on separate semiconductor dies carried and interconnected within a multi-chip module (MCM) a single processor component of the computing device. As still another alternative, the GPU may be implemented as part of a distinct controller processor component controller of the computing device (e.g., a graphics controller implementing a graphics subsystem) that is accessible to and operates under the control of a main processor component of the computing device that incorporates the CPU.

Regardless of the physical implementation of the different cores, the core employed in performing portions of RANSAC in a sequential manner and the one or more other cores performing the other portions of RANSAC in a parallel manner may exchange information through a shared storage space of a storage accessible to both the core and the one or more other cores. Further, the shared storage space may be accessible at a range of addresses at least partly covered by a cache. Depending on the relative sizes of the information exchanged and of the cache lines of the cache, considerable performance benefits may be realized through the exchange of such information via the cache in a manner that avoids latencies associated with storing and/or retrieving the information to and/or from the shared storage space.

The data set from which a model is to be derived and/or definition data indicating characteristics of the model to be derived may be received by the computing device incorporating the different cores from one or more other computing devices. This may be the case where the computing device is one of numerous computing devices in a set of computing devices made available to perform such tasks as RANSAC, such as a "server farm." By way of example, a request to perform RANSAC to derive the model from the data set may be submitted to the computing device by a submission device. In receiving such a request, the computing device may receive the definition data from the submission device. Further, the request may include an indication for the computing device to retrieve the data set separately from a storage server.

Alternatively, the data set and/or the specification of characteristics of the model may be generated within the computing device. This may be the case where an application routine requires RANSAC to be performed to derive the model as part of a larger task, such as identifying correlations between sets of pixels in two or more frames captured by an array of two or more cameras as part of using multiple visual perspectives to identify objects in image processing (e.g., homography in image recognition).

Upon deriving the model through such hybrid sequential and parallel performance of portions of RANSAC, either information describing the model itself, or other data created from subsequent processing based on the derived model may be transmitted to another device for use. By way of example, where RANSAC is so employed to derive the model as part of a larger task such as identifying and generating a three-dimensional model of an object, results data that includes a visualization of that object may be transmitted to a viewing device to be visually presented on a display. Alternatively, such a visualization may be visually presented directly by the computing device.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a model processing system 1000 incorporating one or more of a submission device 100, a storage server 300, a computing device 500 and a viewing device 700. In the model processing system 1000, a model having characteristics defined in definition data 130 is derived from a data set 330 by the computing device 500, where the data set 330 may be a data set that includes a high proportion of outliers (e.g., elements that are "noise"). The definition data 130 may be received by the computing device 500 from the submission device 100 as part of a request received from the submission device 100 to perform RANSAC to derive the model. The data set 330 may be retrieved by the computing device 500 from the storage server 300, and such retrieval may be performed by the computing device 500 in response to an indication the request received from the submission device 100 of the storage server 300 as the location at which the data set 330 is stored. However, in other embodiments, one or both of the definition data 130 or the data set 330 may be generated entirely within the computing device 500, instead of being received from another computing device.

Following derivation of the model by the computing device 500, the computing device 500 may transmit the image data 730 conveying a visualization of the model or conveying an image created by the computing device 500 in performing a larger task that included deriving the model. Each of these computing devices may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300, 500 and 700 exchange signals conveying data sets, definition data of characteristics of a model, image data and/or related data through a network 999. However, one or more of these computing devices may exchange other data entirely unrelated to the derivation of a model from a data set or use of that model with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In alternate embodiments, one or more of the submission device 100, the storage server 300 and the viewing device 700 may be coupled to the computing device 500 in an entirely different manner. In still other embodiments, one or more of the definition data 130, the data set 330 and the image data 730 may be conveyed among these computing devices via removable media (e.g., a FLASH memory card, optical disk, magnetic disk, etc.).

In various embodiments, the computing device 500 incorporates one or more of a processor component 550, a cache 555, a storage 560, a display 580, a controller 600 and an interface 390 to couple the computing device 300 to the network 999. The processor component 550 incorporates at least one core 551. The storage 560 stores one or more of the definition data 130, the data set 330, the image data 730, working data 335, test data 530, a control routine 540 and results data 630. The controller 600 incorporates one or more of a processor component 650 and a storage 660. The processor component 650 incorporates one or more cores 651. The storage 660 stores one or more of a control routine 640. A shared storage area 565 is defined within the storage 560 where a subset of storage locations of the storage 560 are made accessible to both of the processor components 550 and 650 to enable the exchange of information therebetween, including the data set 330, the testing data 530 and the results data 630. However, at least a portion of the shared storage area 565 is accessible at a range of addresses that are cached by the cache 555 such that at least some information exchanged between the processor components 550 and 650 may be exchanged through the cache 555 in a manner that avoids delays imposed by latencies in storing data within or retrieving data from the storage 560.

The control routine 540 incorporates a sequence of instructions operative on the processor component 550 in its role as a main processor component of the computing device 500 to implement logic to perform various functions. In executing the control routine 540 in some embodiments, the processor component 550 may receive one or both of the definition data 130 and the data set 330 from other computing devices, or may generate one or both of the definition data 130 and the data set 330, as previously discussed. The processor component 550 then stores the definition data 130 and the data set 330 in the storage 560. In so doing, the processor component 550 may store the data set 330 in the shared storage area 565, where it becomes accessible to both of the processor components 550 and 650.

The definition data 130 includes indications of various characteristics of the mathematical model to be derived via RANSAC, including an indication of the desired format of the mathematical model (e.g., an equation, a matrix or still another format of mathematical expression). By way of example, if the mathematical model to be derived is of a geometric shape such as line, plane, curve, ellipse, polygon, etc., then the definition data 130 may indicate that the type of mathematical model to be derived is to have a format of a geometric equation expressing a geometric relationship among the values of the coordinates of points that are included in that geometric shape. In other examples, the definition data 130 may indicate that the desired format of a model expressing a transform (e.g., between spatial and frequency domains or between two spatial coordinate systems) is a matrix of coefficients. The indication of the format of the model to be derived also provides the processor component 550 with an indication of what is the minimum number of data elements from the data set 330 required to derive the model. Among those familiar with RANSAC, such a minimum number of elements is often referred to as a minimal sample set (MSS). Each of the elements incorporated into a MSS is randomly selected from the data set from which the model is to be derived.

The processor component 550 then generates a set of multiple MSSs to be provided to the processor component 650 as the testing data 530. The elements of data making up each of these MSSs are randomly selected from the data elements making up the data set 330. The number of MSSs in the set may be based entirely on the number of instances of a series of calculations that the processor component 650 is able to execute in parallel. By way of example, the processor component 650 may be capable of executing up to a specific maximum number of threads of execution in parallel, where in each thread a sequence of instruction is executed independently of the other threads. In some embodiments, each of the cores 651 of the processor component 650 may be capable of executing a single one of such threads in parallel with the execution of another thread by each of the other cores 651. Alternatively or additionally, each of the cores 651 may incorporate a register set and/or other features supporting SIMD operations in which the same mathematical and other operations are able to be performed simultaneously on multiple pieces of entirely separate data. In other words, the processor component 550 generates a number of MSSs that match the number of sets of data that the processor component 650 is able to perform operations on in parallel.

The processor component 550 also stores indications of characteristics of the model to be derived in the testing data 530, such as an indication of the desired format as earlier retrieved from the definition data 130. The processor component 550 further stores a fit threshold value in the testing data 530 to be employed by the processor component 650 in testing each of the proposed models. The processor component 550 then signals the processor component 650 to use the information within the testing data 530 to generate a set of multiple proposed models, to test them for degree of fit with the data set 330 using the fit threshold, and to provide the processor component 550 the results of those tests in the results data 630.

The control routine 640 incorporates a sequence of instructions operative on the processor component 650 in its role as a controller processor component of the controller 600 of the computing device 500 to implement logic to perform various functions. In executing the control routine 640 and in response to the signal from the processor component 550, the processor component 650 generates a set of proposed models, one for each of the MSSs provided by the processor component 550 in the testing data 530. The processor component 650 performs this generation of all of the proposed models of the set in parallel through use of multiple cores 651 supporting the execution of multiple threads, SIMD support and/or other parallel processing techniques as may be implemented in the architecture of the processor component 650.

After deriving a proposed model for each of the MSSs, the processor component 650 then tests each of the proposed models with all of the elements of data within the data set 330. More specifically, for each of the proposed models, the processor component 650 checks how many of the data elements of the data set 330 fit the proposed model to a degree that is within the fit threshold. For each proposed model, the data elements that do fit within the fit threshold are determined to be "inliers" of that proposed model and the data elements that do not fit within the fit threshold are determined to be "outliers" of that proposed model. Among those familiar with RANSAC, the set of all inliers of a proposed model from a data set are often referred to as a "consensus set." The processor component 650 stores indications of all of the proposed models derived by the processor component 650 in the results data 650. The processor component 650 also stores indications of how many inliers are present in the consensus set of each of the proposed models in the results data 650. The processor component 650 then signals the processor component 550 with an indication that derivation and testing of this set of proposed models is complete.

Figure 3:
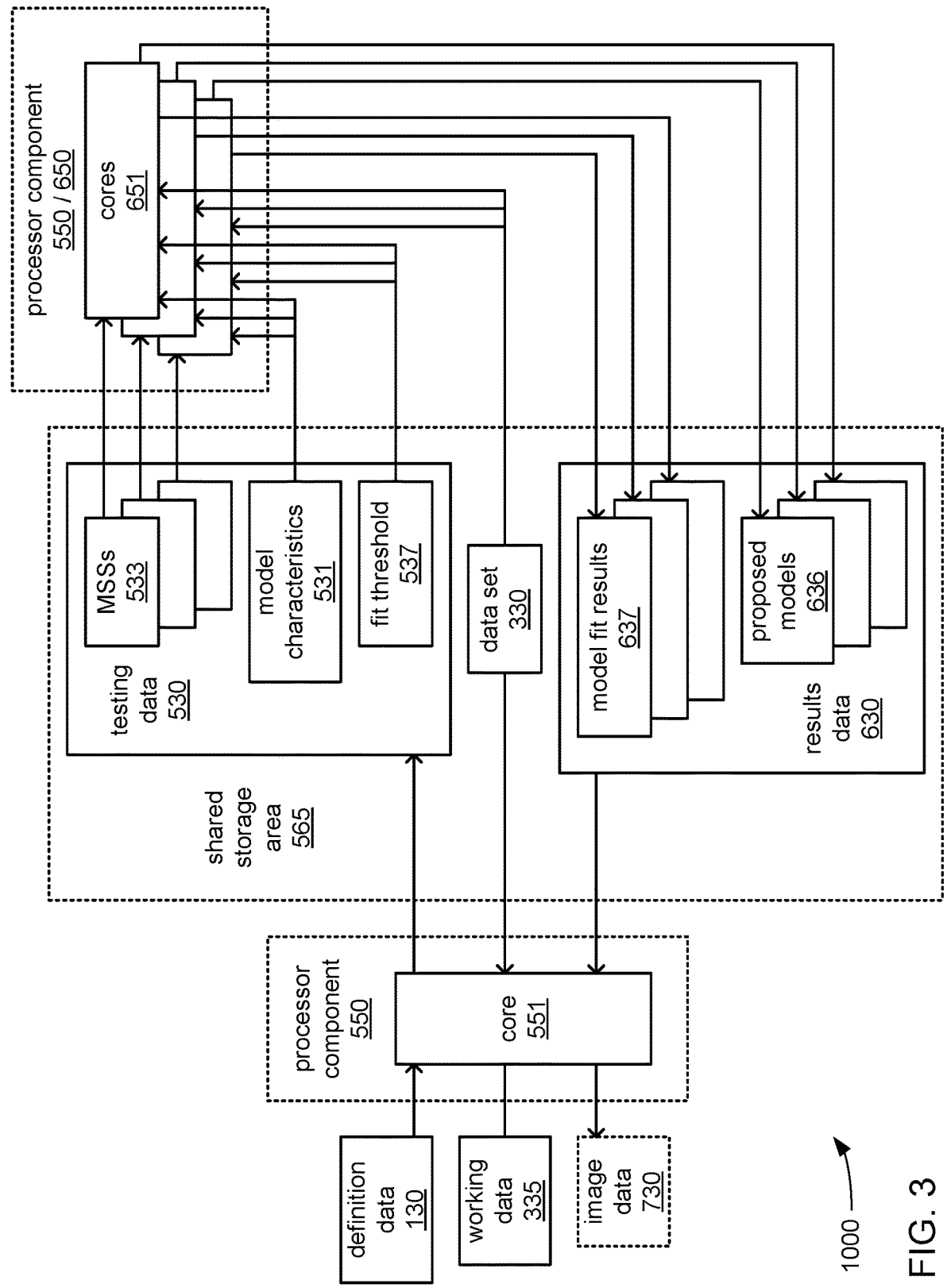
FIGS. 3 and 4 each illustrate the use of parallel processing in performing a portion of RANSAC according to an embodiment.

FIG. 3 depicts an example embodiment of such an exchange of information between the processor components 550 and 650 via the shared storage area 565 in greater detail. As depicted, the processor component 550 generates a set of multiple MSSs 533 from the data set 330 and includes the set of multiple MSSs 533 in the testing data 530. The processor component 550 also includes model characteristics 531 in the testing data 530 to specify such characteristics as the desired format of the model to the processor component 650. The processor component 550 further includes a fit threshold 537 to specify the degree to which each data element of the data set 330 must fit a proposed model to be determined to be an inlier of that proposed model, and therefore included in the consensus set of that model.

As also depicted in FIG. 3, the processor component 651 enables parallel processing through the provision of multiple cores 651, each capable of supporting the execution of at least one thread in parallel with the other cores 651. During execution of the control routine 640 by the processor component 650, each of the cores 651 retrieves the model characteristics 531 and a corresponding one of the MSSs 533 of the testing data 530 from within the shared storage area 565. Each of the cores 651 then uses the model characteristics 531 and its corresponding one of the MSSs 533 to generate a corresponding proposed model. Each of the cores 651 then retrieves the data set 330 and the fit threshold 537 of the testing data 530. Each of the cores 651 tests the degree of fit of each of the data elements of the data set 330 with its corresponding proposed model to determine which are inliers of a consensus set of its corresponding proposed model, and which are outliers. Each of the cores 651 then stores a specification of its corresponding proposed model 636 in the results data 630, along with an indication of model fit results 637 specifying the quantity of inliers in the consensus set of its corresponding proposed model.

Figure 4:
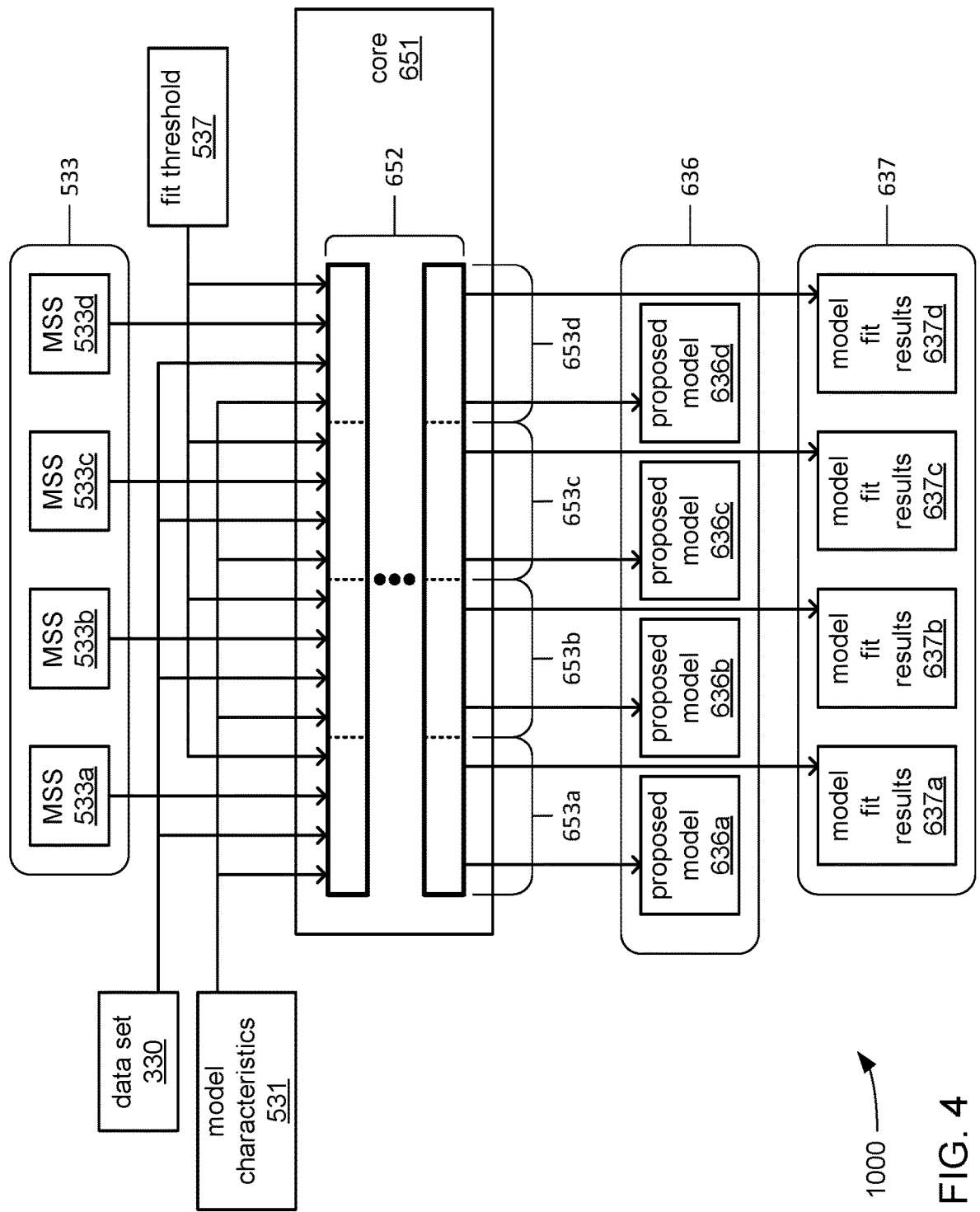

FIG. 4 depicts another example embodiment of such an exchange of information via the shared storage area 565 in greater detail. Again, the processor component 650 receives the multiple MSSs 533 (more specifically labeled as 533a-d), along with the model characteristics 531 and the fit threshold 537. However, unlike what was depicted and discussed in the example embodiment of FIG. 3, in FIG. 4, at least one of the cores 651 of the processor component 650 includes a register set 652 in which each register is divided into multiple lanes 653a-d as part of providing support for SIMD operations in which the same mathematical operations are able to be performed in parallel on multiple separate pieces of data.

As part of making use of such support for parallelism through use of SIMD operations, each of the MSSs 533a-d is allocated to a different one of the lanes 653a-d, respectively. In each of the lanes 653a-d, the model characteristics 531 and a corresponding one of the MSSs 533a-d are used to generate a corresponding proposed model. The data set 330 and the fit threshold 537 are then retrieved, and used in each of the lanes 653a-d to test the degree of fit of each of the data elements of the data set 330 with the corresponding proposed model to determine which of the data elements of the data set 330 are inliers of a consensus set of the corresponding proposed model. For each of the lanes 653a-d, a corresponding specification 636a-d (each of which is an instance of the specification 636) of the corresponding proposed model is stored in the results data 630. Also, for each of the lanes 653a-d, a corresponding indication of model fit results 637a-d (each of which is an instance of the model fit results 637) specifying the quantity of inliers in the corresponding consensus set is also stored in the results data 630.

Therefore, as has been discussed, and as depicted in FIGS. 3 and 4, support for the parallel derivation and testing of multiple proposed models may be provided through the provision of multiple cores 651, or through the provision of multiple lanes in registers of a register set 652 of one of the cores 651. In still other embodiments, both approaches may be combined to enable still greater parallelism in which the processor component 650 incorporates multiple cores 651 and each of those cores incorporates a register set of registers 652 that support multiple lanes.

Returning to FIG. 1, in further executing the control routine 540 and in response to the signal from the processor component 650 that derivation and testing of a set of proposed models for the set MSSs of the testing data 530 is complete, the processor component 550 determines which proposed model of the new set is the best. In some embodiments, the processor component 550 may do so by comparing the indications in the results data 630 of how many inliers are in the consensus set of each of the proposed models of the new set of proposed models. The one of the proposed models of the new set that has the greatest number of inliers in its consensus set is then deemed the best proposed model of the new set of proposed models. The best of the proposed models in the new set is then compared to the overall best proposed model from all of the previously derived and tested sets of proposed models. A specification of the overall best proposed model of all previous sets may be stored and maintained as part of the working data 335 along with an indication of how many data elements of the data set 330 are inliers in its consensus set. If the best of the proposed models in the new set of proposed models is determined to be better than the overall best proposed model of all of the previously derived and tested sets of proposed models, then the best of the proposed models in the new set becomes the new overall best proposed model. In that case, a specification of the best of the proposed models in the new set would be stored in the working data 335 along with an indication of how many data elements of the data set 330 are inliers in its consensus set.

If the overall best proposed model of all of the previously derived and tested sets of proposed models is replaced with the best proposed model of the new set of proposed models, then the processor component 550 may recalculate the overall quantity of proposed models that must be derived and tested to derive an accurate model that best fits the data set 330 within a predetermined degree of probability from all of the proposed models. Regardless of whether the overall best proposed model of all of the previously derived and tested sets of proposed models is replaced, the quantity of proposed models generated and tested so far is compared to the overall quantity of proposed models that must be derived and tested to determine if another set of proposed models is to be derived and tested. If not, then whatever proposed model is the current overall best proposed model (the specification of which is maintained in the working data 335) becomes the model derived by this performance of RANSAC. The processor component 550 may also store and maintains the quantity of proposed models generated and tested so far as part of the working data 335 along with the overall quantity of proposed models that must be derived and tested.

In some embodiments, the probability is $(1-W^C)$ that RANSAC will errantly select an inaccurate proposed model as being the accurate model, where W is the quantity of inliers in the consensus set of the overall best proposed model among those derived and tested so far, and where C is the quantity of data elements randomly selected from the data set 330 to generate each MSS. The inaccurate proposed model would be a proposed model derived from a MSS that includes at least one randomly selected data element that is an outlier of the accurate model. Therefore, where K is the overall quantity of proposed models that must be derived and tested, the probability that all of the MSSs from which the proposed models are derived include at least one outlier of the accurate model such that none of the proposed models are accurate is $(1-W^C)^K$.

Consequently, K should be selected to be large enough to cause $(1-W^C)^K$ to become equal to or smaller than an acceptable failure threshold of 1-p, where p is a predetermined confidence level associated with the desired degree of certainty of arriving at the accurate model. Thus, in such embodiments, the value of K is calculated as follows:

$$K \geq \frac{\log(1-p)}{\log(1-W^C)}$$

Thus, in such embodiments, following each iteration of generating a set of MSSs, and both deriving and testing a set of proposed models, the quantity of proposed models derived and tested so far is compared to the overall quantity K of proposed models required to determine whether or not to perform another such iteration. Given that each set of proposed models is made up of a quantity of proposed models that is based on the how many the processor component 650 is able to derive and test in parallel, the quantity of proposed models that is actually derived and tested through multiple iterations may be a multiple of the quantity of proposed models in each set. Therefore, the quantity of proposed models derived and tested may ultimately exceed the quantity K of proposed models required to be derived and tested by a relatively small amount.

Figure 5:
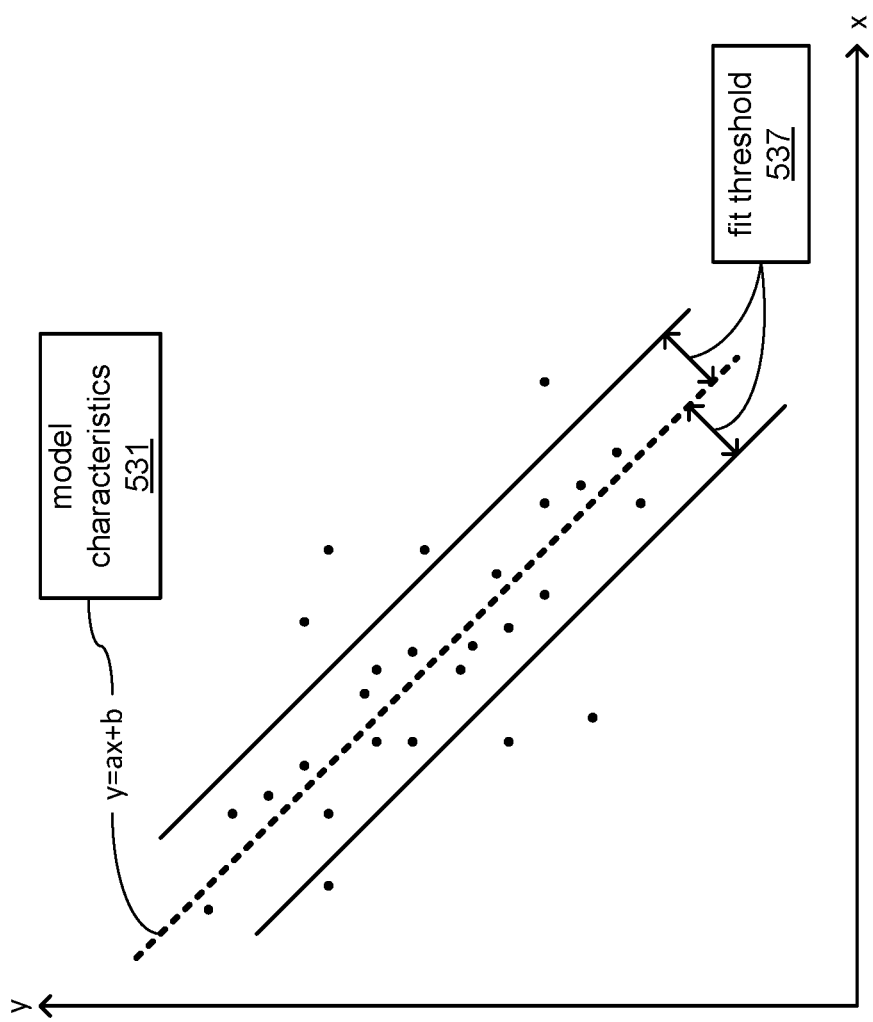
FIG. 5 illustrates an example of deriving a mathematical model according to an embodiment.

FIG. 5 depicts an example use of an embodiment of performing RANSAC with a hybrid of parallel and serial processing. It should be noted that this is a highly simplified example of seeking the mathematical model of a line that best fits the set of points of a plane, where each such point is a member of the data set 330. As familiar to those skilled in the art, a line extending within a plane defined by axes X and Y is typically described with an equation such as y=ax+b where the values of a and b must be determined to derive an accurate model of the depicted line. The definition data 130 may include an indication of the format of this equation being the desired format of proposed models to be derived by the processor component 650, as well as an indication to the effect that two data elements of the data set 330 that represent two points in the plane are required in each MSS to enable derivation of proposed models.

The processor component 550 generates a set of MSSs 533, each of which includes a pair of randomly selected ones of the points represented by the data set 330, and stores the set of MSSs 533 as part of the testing data 530. The processor component 550 also stores an indication of model characteristics 531, including an indication of the y=ax+b equation format, as part of the testing data 530, along with an indication of a fit threshold value 537. The processor component 550 then signals the processor component 650 to derive a set of proposed models, test them, and provide the results of that testing in the results data 630.

In response to the signal from the processor component 550, the processor component 650 employs the set of MSSs 533 and the model characteristics 531 to derive a corresponding set of proposed models, each proposed model corresponding to one of the MSSs 533. Each proposed model is a mathematical expression of a different proposed line (only one of which is shown as a dotted line in FIG. 5) that extends through the two points randomly selected from the data set 330. Again, each of the proposed models is derived in parallel with all of the others in the set of proposed models derived from the set of MSSs 533.

After deriving the set of proposed models, the processor component 650 tests each of the proposed models of the set, in parallel, by determining whether each of the points of the data set 330 fits each of the proposed models to a degree within the fit threshold 537. As depicted in FIG. 5, the fit threshold 537 may specify a maximum distance within the plane from the line corresponding to a proposed model for that a point to fit well enough to be an inlier included in the consensus of that proposed model. As depicted, the distance specified by the fit threshold 537 may be measured orthogonally to with respect to the depicted example of a proposed line. Following the testing of all of the proposed models of the set of proposed models in parallel, the processor component 650 stores specifications 636 of the proposed models as the results data 630, along with model fit results 637 specifying the quantity of inliers within the consensus set for each of the proposed models. The processor component 650 then signals the processor component 550 that the derivation of testing of the set of proposed models is complete.

In response to the signal from the processor component 650, the processor component 550 analyzes the model fit results 637 to determine which proposed models of the set of proposed models was found during testing to fit the points of the data set 330 best. In some embodiments, this may be determined by comparing the quantities of inliers in the consensus sets of each of the proposed models to identify the proposed model with greatest number of inliers in its consensus set. That best one of the proposed models of the set is then compared with the overall best proposed model out of all of the previous sets of models (if there are previous sets of models). If the best proposed model of the set is a better fit with the points of the data set 330 (e.g., has a greater quantity of inliers in its consensus set) than the overall best proposed model out of all previous sets, then the best proposed model of the set becomes the new overall best proposed model. Also, if the best proposed model of the set is a better fit than the overall best proposed model out of all previous sets, then the number of proposed models required to determine an accurate model with a predetermined degree of certainty is recalculated based at least in part on the quantity of inliers within the consensus set of the new overall best proposed model. Regardless of whether or not such recalculation occurs, the quantity of proposed models derived and tested so far is then compared to the quantity of proposed models so required to determine whether another set of proposed models is to be derived and tested.

Returning to FIG. 1, during the parallel derivation and testing of a set of proposed models by the processor component 650, the processor component 550, in continuing to execute the control routine 540, may preemptively generate the next set of MSSs and store them in the testing data 530 in preparation for what may be another iteration. Despite the uncertainty of whether another iteration is to be performed, preemptively generating the next set of MSSs may be deemed desirable to minimize delays between the derivation and testing of sets of proposed models by the processor component 650 to increase the speed with which RANSAC is performed.

As previously discussed, at least a portion of the shared storage area 565 may be cached by the cache 555. Again, depending on the size and architecture of the cache 555 relative to the size of the data set 330, the testing data 530 and/or the results data 630, it may be possible to exchange such information between the processor components 550 and 650 through the cache 555 without incurring delays due to the time required to either store data in or retrieve data from the storage 560. Alternatively or additionally, in some embodiments, the cache 555 may be controllable by one or the other of the processor components 550 and 650 to allocate a portion of the cache 555 to serve as a buffer to convey such data therebetween without involving either read or write operations to the storage 560, at all.

As previously discussed, at the point at which no more sets of proposed models are to be derived and tested, whatever proposed model is currently the overall best proposed model becomes the model derived by this hybrid parallel and sequential performance of RANSAC. The processor component 550 may then operate the interface 590 to transmit an indication of this model and/or to transmit other data derived from this model to another computing device. By way of example, the processor component 550 may generate a visualization of the model and store it as the image data 730, which the processor component 550 may then transmit to the viewing device 700 to be visually presented on a display 780 thereof. Alternatively, the processor component 550 may more directly visually present the image data 730 on the display 580 (if present). In another example, such a hybrid of parallel and sequential performance of RANSAC may be employed to derive the model as part of a larger function, such as the generation of visual imagery using the model (e.g., rendering an image of animation), or identifying an object as part of image processing. Thus, the image data 730 may represent an image rendered at least partly through use of the model or may represent aspects of an object identified in an image using the model.

Figure 2:
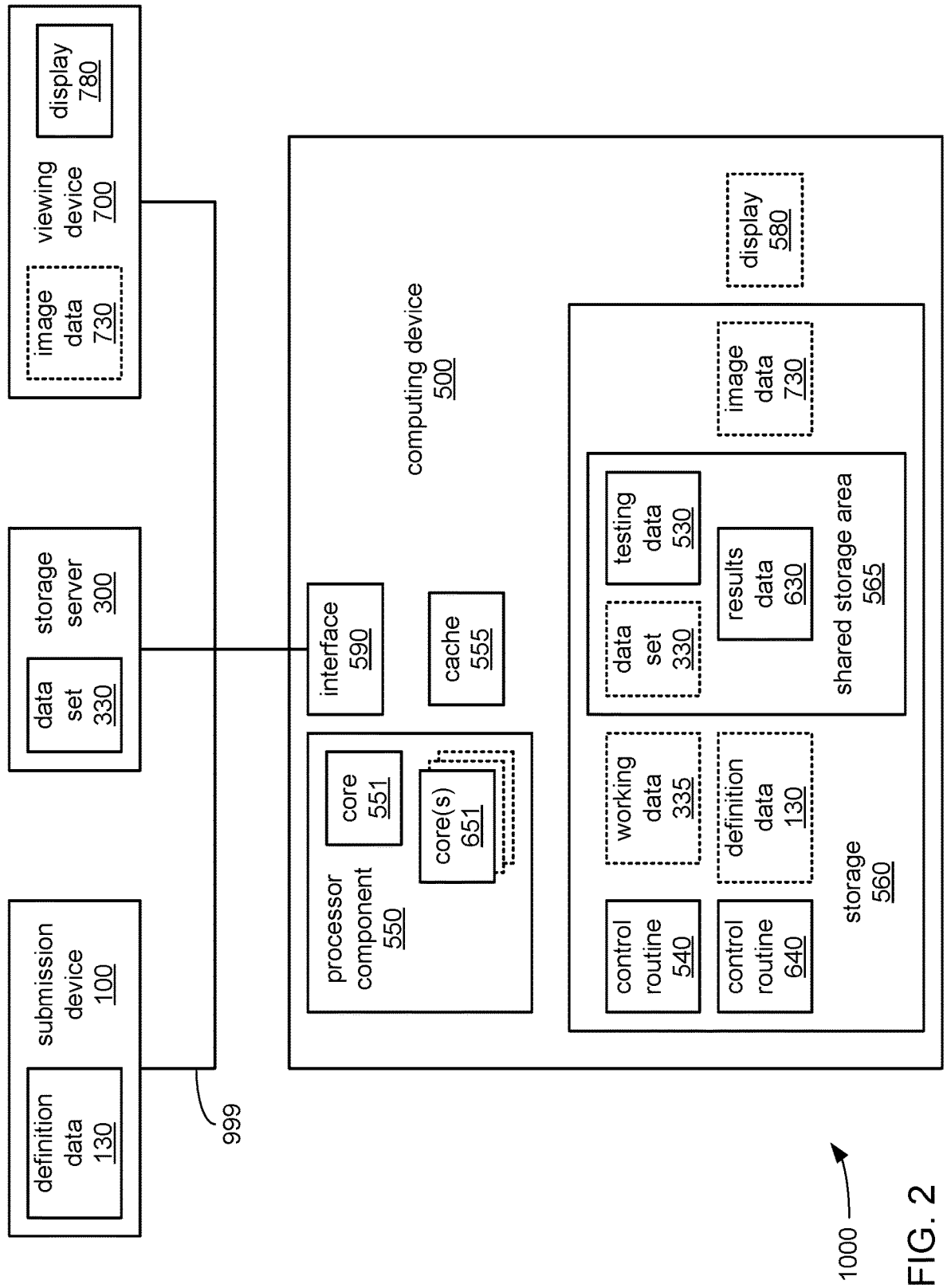
FIG. 2 illustrates an alternate embodiment of a model processing system.

FIG. 2 illustrates a block diagram of an alternate embodiment of the model processing system 1000 that includes an alternate embodiment of the computing device 500. The alternate embodiment of the model processing system 1000 of FIG. 2 is similar to the embodiment of FIG. 1 in many ways, and thus, like reference numerals are used to refer to like elements throughout. However, unlike the computing device 500 of FIG. 1, the computing device 500 of FIG. 2 does not incorporate the controller 600. Thus, unlike the computing device 500 of FIG. 1, in the computing device 500 of FIG. 2, it is the processor component 550 that incorporates both cores 551 and 651, and therefore executes both the control routine 640 in lieu of there being a separate processor component 650 to do so.

Therefore, in the alternate embodiment of the motion processing system 1000 of FIG. 2, the processor component 550 performs both the sequential processing of some portions and the parallel processing of other portions of a hybrid sequential and parallel processing performance of RANSAC. More precisely, the core 551 may sequentially perform the generation of MSSs 533 from the data set 330, and the one or more cores 651 (also incorporated into the processor component 550 in this alternate embodiment) may perform the derivation and testing of sets of proposed models in parallel. In this alternate embodiment, the cache 555 may additionally be incorporated into the processor component 550.

In various embodiments, each of the processor components 550 and 650 may include any of a wide variety of commercially available processors. Also, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

Further, the cores 551 and/or 651 of the processor components 550 and/or 650 may each be implemented with pairs of heterogeneous cores that include one core capable of achieving relatively high processing throughput at the expense of greater power consumption and another core capable of achieving relatively low power consumption at the expense of slower processing throughput. In such implementations of the cores 551 and/or 651, automatic switching between cores of each such heterogeneous pair of cores may occur in response to the level of processing throughput at various times and in a manner sufficiently transparent to operating systems and/or application routines that such a heterogeneous pair of cores is perceived as a single core.

By way of example, where the core 551 is engaged in generating a new set of MSSs 533 or in comparing quantities of inliers, the higher processing throughput core of a heterogeneous pair of cores making up the core 551 may be in operation. However, depending on the amount of time required for the parallel derivation and testing of a new set of proposed models 636, the core 551 may be caused to remain relatively idle while waiting for such derivation and testing to be completed such that the lower power consumption core of that heterogeneous pair of cores may be in operation. Correspondingly, while the one or more cores 651 of the processor component 650 are engaged in deriving and testing a new set of proposed models 636, the higher processing throughput cores of each of the heterogeneous pair of cores making up each of the cores 651 may be in operation. However, depending on the amount of time required for the comparisons of quantities of inlier values, the one or more cores 651 may be caused to remain relatively idle waiting for such comparisons to conclude and a determination to be made as to whether another set of proposed models is to be derived and tested such that the lower power consumption cores of each of those heterogeneous pairs of cores may be in operation.

Although each of the processor components 550 and 650 may include any of a variety of types of processor, it is envisioned that the processor component 650 of the controller 600 (if present) may be somewhat specialized and/or optimized to perform tasks related to graphics and/or video. More broadly, it is envisioned that the controller 600 embodies a graphics subsystem of the computing device 500 to enable the performance of tasks related to graphics rendering, video compression, image rescaling, etc., using components separate and distinct from the processor component 650 and its more closely related components.

In various embodiments, each of the storages 560 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 590 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
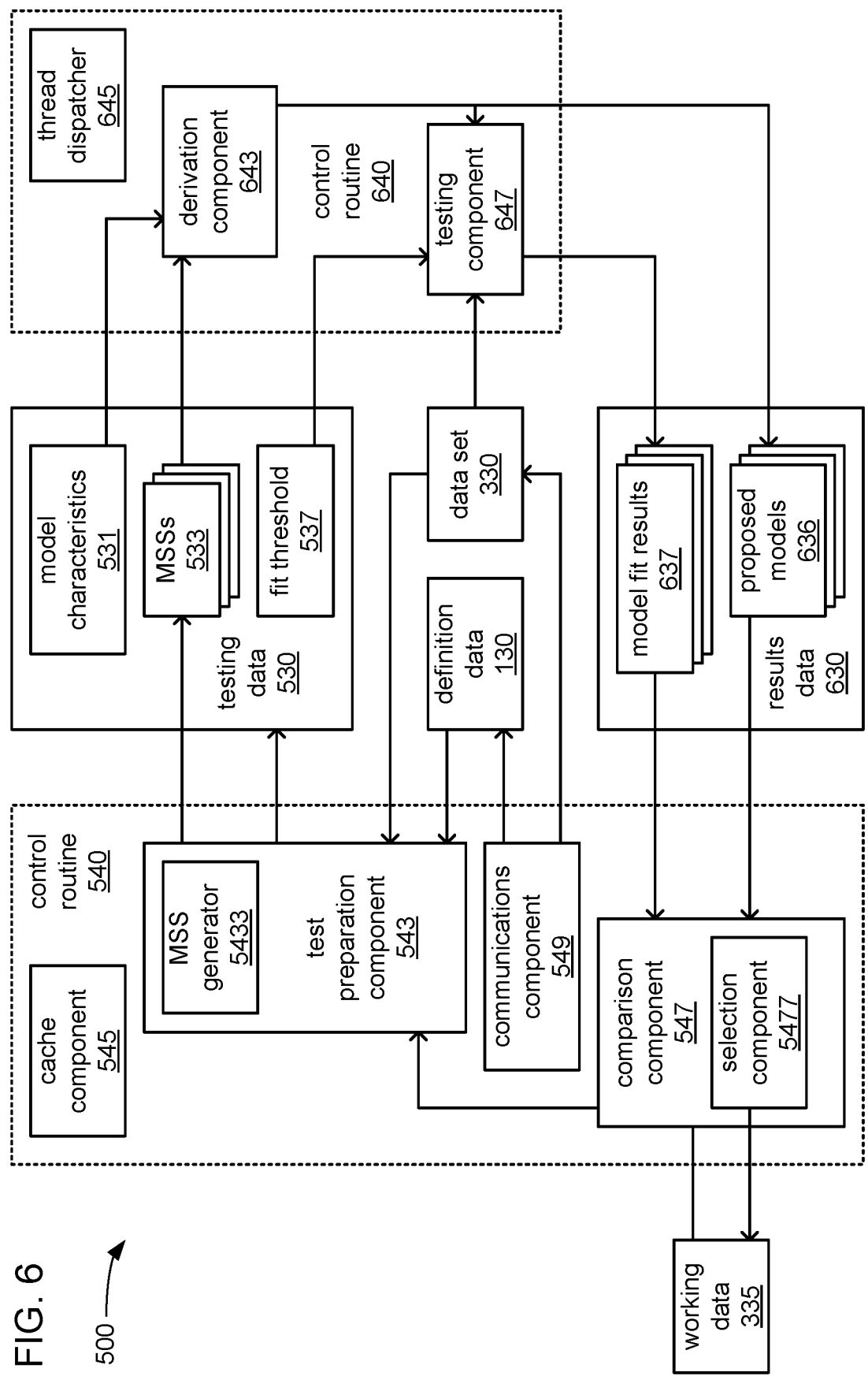
FIG. 6 illustrates a portion of an embodiment.
Figure 7:
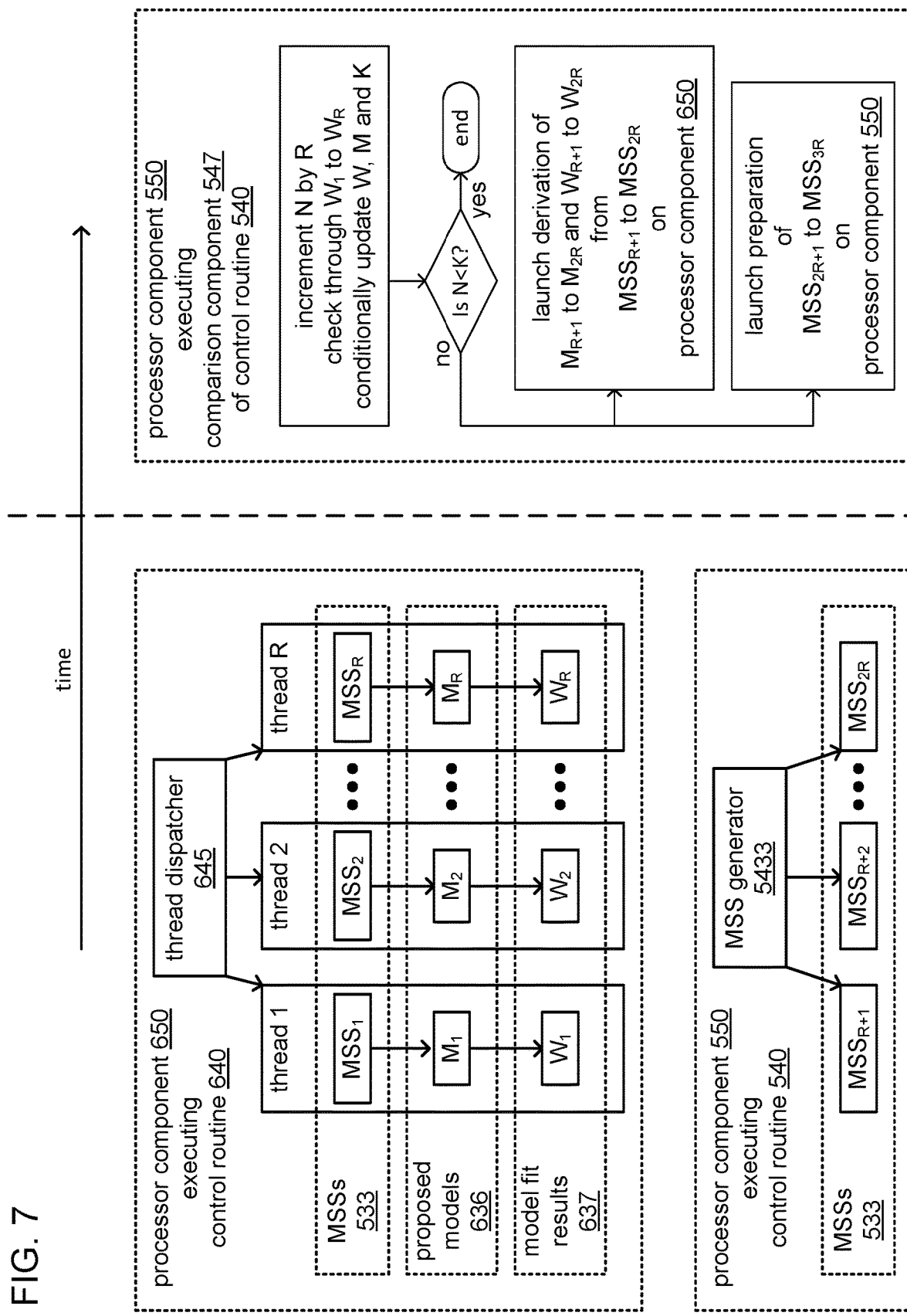
FIGS. 7-9 each illustrate a logic flow according to an embodiment.
Figure 8:
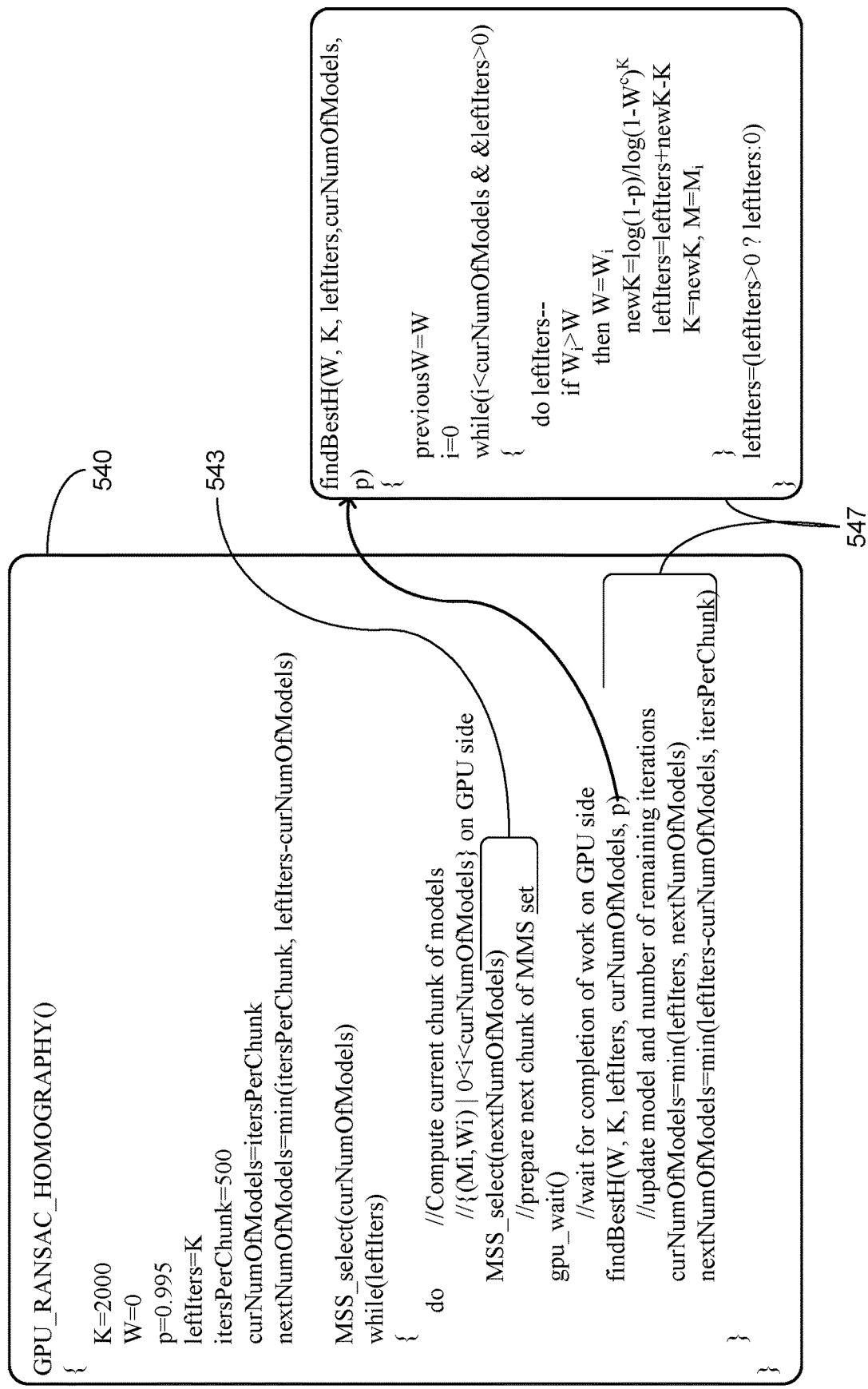

FIG. 6 illustrates a block diagram of a portion of an embodiment of the video processing system 1000 of either FIG. 1 or FIG. 2 in greater detail. More specifically, FIG. 6 depicts aspects of the operating environment of the computing device 500, including the operating environment of the controller 600, in which the processor component 550 sequentially performs portions of RANSAC in executing the control routine 540, and in which the processor component 550 or 650 performs derivation and testing of sets of proposed models in parallel. FIG. 7 illustrates temporal aspects of operation of that portion in greater detail, especially aspects of parallelism between the operating environments of the computing device 500 and the controller 600. FIG. 8 illustrates pseudocode of example logic of that portion that determines when to cease performance of RANSAC. As recognizable to those skilled in the art, the control routines 540 and 640, including the components of which each is composed, are selected to be operative on whatever type of processor or processors that are selected to implement applicable ones of the processor components 550 or 650.

In various embodiments, each of the control routines 540 and 640 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 550 or 650. Where one or more device drivers are included, those device drivers may provide support for any of a variety of other components, whether hardware or software components, of the computing device 500 or the controller 600.

The control routine 540 may include a communications component 549 executable by the processor component 550 to operate the interface 590 to transmit and receive signals via the network 999 as has been described. Among the signals received may be signals conveying the definition data 130, the data set 330 and/or the image data 730 among one or more of the computing devices 100, 300, 500 or 700 via the network 999. As will be recognized by those skilled in the art, the communications component 549 is selected to be operable with whatever type of interface technology is selected to implement the interface 590.

The control routine 540 may include a cache component 545 executable by the processor component 550 to configure at least a portion of the cache 555 to function as a buffer between the processor components 550 and 650 to enable one or more of the data set 330, the testing data 530 and the results data 630 to be exchanged therebetween solely through the cache 555. Alternatively or additionally, the cache component 545 may configure at least a portion of the cache 555 to cache at least a portion of the shared storage area 565.

The control routine 540 may include a test preparation component 543 executable by the processor component 550 to store information in the testing data 530 in preparation for the generation and testing of a new set of proposed models. As depicted, the test preparation component 543 may incorporate a MSS generator 5433 to generate a new set of MSSs 533 on which the new set of proposed models is to be based. The test preparation component 543 may then store the new set of MSSs 533 as part of the testing data 530. As previously discussed, derivation of a new set of MSSs 533 may be done preemptively while generation and testing of new models from the last set of MSSs 533 occurs. The test preparation component 543 may retrieve indications of a fit threshold and/or of characteristics that the proposed models of the new set of proposed models are to have (e.g., a format), and store those indications in the testing data 530 as the fit threshold 537 and/or the model characteristics 531, respectively.

The control routine 640 may include a derivation component 643 executable by the processor component 650 to derive, in parallel, a new set of proposed models 636 based on the new set of MSSs 533 of the testing data 530. The derivation component 643 may retrieve the model characteristics 531, as well as the MSSs 533 of the testing data 530, to obtain an indication of the format that each of the proposed models is to have. Upon generating the new set of proposed models 636, the derivation component 643 may then store specifications of each of the proposed models 636 of the new set of proposed models 636 as part of the results data 630.

The control routine 640 may include a testing component 647 executable by the processor component 650 to test, in parallel, the new set of proposed models 636 generated by the derivation component 643 for fit with the data elements of the data set 330. The testing component 647 may retrieve the fit threshold 537 from the testing data 530, as well as retrieving the data set 330. Upon completion of testing of the new set of proposed models 636, the testing component 647 may store indications of the degree of fit of each of the proposed models 636 to the data elements of the data set 330 as the model fit results 637 of the results data 630. As previously discussed, the indications of degree of fit may include an indication of the number of data elements of the data set 330 that are inliers in the consensus set of each of the proposed models in the new set.

The control routine 640 may include a thread dispatcher 645 executable by the processor component 650 to instantiate multiple threads of execution to enable the derivation and testing of each new set of proposed models 636 by the derivation component 643 and the testing component 647, respectively. More precisely, the thread dispatcher 645 may instantiate separate threads to be associated with each MSS 533 of a new set of MSSs 533 generated by the MSS generator 5433. The derivation of each proposed model 636 from one of the MSSs 533 may occur on the thread associated with that one of the MSSs 533, as well as the subsequent testing each proposed model 636.

The control routine 540 may include a comparison component 547 executable by the processor component 550 to control the progress of the performance of RANSAC. The comparison component 547 may retrieve the model fit results 637 of the results data 630 and compare the indications therein of the degree of fit of each of the proposed models of the new set of proposed models to determine which one of the new set best fits the data set 330. The comparison component 547 may then compare the indication of degree of fit of the best fitting of the proposed models of the new set to an indication maintained in the working data 335 of the degree of fit of the overall best proposed model of all previous sets of proposed models. As depicted, the comparison component 547 may incorporate a selection component 5477 to select the best fitting proposed model of the new set of proposed models to become the new overall best proposed model if the best proposed model of the new set fits the data set 330 to a greater degree than the overall best proposed model. As has been discussed, a proposed model may be determined to be a better fit if it has a greater number of inliers in its consensus set. If the best proposed model of the new set of proposed models is a better fit, then the selection component 5477 retrieves the specification of that model 636 from the results data 630 and stores that specification in the working data 335 along with how many of the data elements of the data set 330 are inliers in the consensus set of the best proposed model of the new set.

If the best fitting of the proposed models of the new set is a better fit such that it becomes the new overall best proposed model, then the comparison component 547 may recalculate the quantity of proposed models required to determine an accurate model with a predetermined degree of certainty. Regardless of whether the overall best proposed model is replaced such that there may or may not be such a recalculation of the number of proposed models required, with each set of proposed models that is derived and tested, the comparison component 547 compares the quantity of proposed models derived and tested so far to the quantity of proposed models required to determine whether another new set of proposed models is to be derived and tested. The comparison component 547 may store and maintain indications of how many proposed models have been derived and tested so far and how many proposed models are required to determine an accurate model with a predetermined degree of certainty in the working data 335. If the quantity of proposed models derived and tested so far already meets or exceed the required quantity, then no more sets of proposed models are derived and tested, and whatever proposed model is currently the overall best proposed model (the specification of which is stored in the working data 335) becomes the model derived by the performance of RANSAC.

Turning more specifically to FIG. 7, as depicted with a timeline progressing from left to right, there may be periods in which at least a portion of each of the control routines 540 and 640 are executed in parallel that alternate with other periods in which the control routine 540 executes where a determination is made as to whether further performance of RANSAC is required. More specifically, there may be periods during which the control routine 640 is executed to derive and test sets of proposed models 636 in parallel with execution of the control routine 540 to preemptively derive a new set of MSSs 533.

During such periods of parallel execution, the thread dispatcher 645 of the control routine 640 associates threads (e.g., the depicted threads 1 through R) to corresponding MSSs 533 of a set of MSSs 533 (e.g., corresponding ones of $MSS_1$ through $MSS_R$) earlier received from the MSS generator 5433 of the control routine 540. In each of these threads, corresponding proposed models 636 of a set of proposed models 636 (e.g., corresponding ones of the proposed models $M_1$ through $M_R$) are derived from the set of MSSs 533. Then, in each of these threads, indications of model fit results 637, including corresponding indications of quantities of inliers of each of the proposed models 636 (e.g., quantities of inliers $W_1$ through $W_R$) are generated from the testing of each of those proposed models 636 against the data set 330. As has been discussed, the threads 1 through R associated by the thread dispatcher 645 with corresponding ones of a set of the MSSs 533 may be executed in parallel. In some embodiments, each of the threads 1 through R may be assigned for execution by a different core 651 of the processor component 650, thereby enabling parallel execution of all of the threads 1 through R simultaneously. However, in embodiments in which there isn't a sufficient quantity of available cores 651 to enable simultaneous execution of all of the threads 1 through R, subsets of the threads 1 through R may be executed in parallel among the quantity of cores 651 that are available.

Also during such periods of parallel execution, the MSS generator 5433 of the control routine 540 may preemptively derive another set of MSSs 533 (e.g., $MSS_{R+1}$ through $MSS_R$) in preparation for the possibility that another new set of proposed models 636 (e.g., $M_{R+1}$ through $M_{2R}$) is to be derived and tested. As has been previously discussed, the comparatively less computationally complex generation of MSSs 533 by the MSS generator 5433 may be performed using sequential processing (e.g., a single thread) executed by the processor component 550.

During the other periods, the comparison component 547 performs comparisons of the quantities of inliers of a new set of proposed models 636 (e.g., quantities of inliers $W_1$ through $W_R$ of the proposed models $M_1$ through $M_R$, respectively) against the quantity of inliers W of the overall best proposed model M of all of the proposed models tested so far. More specifically, the quantity N of proposed models 636 that have been derived and tested so far is incremented to reflect the completion of derivation and testing of a new set of proposed models 636 during the last period of parallel execution of the control routines 540 and 640. Then, a check is made as to whether any of the proposed models 636 of the new set of proposed models 636 is a better fit to the data set 330 than the overall best proposed model M. As has been described, if the quantity of inliers of one of the proposed models 636 of the new set of proposed models 636 has a quantity of inliers greater than that of the overall best proposed model M (e.g., of one of $W_1$ through $W_R$ is greater than W), then that proposed model 636 of the new set of proposed models 636 becomes the new overall best proposed model M. If the overall best proposed model M is so replaced, then the indication of the quantity W of inliers associated with the best overall proposed model M is updated to reflect the quantity of inliers associated with the new best overall proposed model M. Further, if the overall best proposed model M is so replaced, the quantity K of proposed models required to determine an accurate model with a predetermined degree of certainty is recalculated in light of the new quantity of inliers W associated with the new overall best proposed model.

Following the conditional replacement of the overall best proposed model M, the updating of the associated quantity of inliers W and the recalculating of the required quantity K of proposed models 636, a check is made as to whether the quantity N of proposed models 636 that have been derived and tested so far is still less than the quantity K of proposed models 636 required to determine an accurate model with a predetermined degree of certainty. If N is no longer less than K, then further execution of control routine 540 and 640 to perform RANSAC ceases, and the current overall best proposed model M is deemed the accurate model derived by the performance of RANSAC. However, if N is less than K, then another period of parallel execution of the control routines 540 and 640 is launched. Specifically, the derivation of another new set of proposed models 636 (e.g., proposed models $M_{R+1}$ through $M_{2R}$) from another new set of MSSs 533 (e.g., $MSS_{R+1}$ through $MSS_{2R}$) is launched along with the testing of those proposed models 636 against the data set 330, and these are launched in parallel with the preemptive generation of still another new set of MSSs 533 (e.g., $MSS_{2R+1}$ through $MSS_{3R}$).

FIG. 8 depicts an example of operation of the logic of at least the comparison component 547 of the control routine 540 in determining whether or not to continue performance of RANSAC in a homography application. In this example, the quantity K of proposed models 636 required to determine an accurate model with a predetermined degree of certainty (e.g., within a predetermined acceptable failure threshold of 1-p) is initially set to a quantity of 2000, which defines the upper limit of proposed models 636 that will be tried. The predetermined confidence level p that defines that threshold is set to 0.995. The quantity itersPerChunk of proposed models 636 to be derived and tested in each set of proposed models 636 is set to a quantity of 500, which defines the upper limit of proposed models 636 that will be derived and tested in parallel throughout execution of the control routine 640.

In preparation for execution, the quantity leftIters of proposed models 636 still to be derived and tested to reach the quantity K is initially set to K (e.g., an initial quantity of 2000). The quantity curNumOfModels of proposed models 636 to be derived and tested in parallel in a current performance of such derivation and testing is initialized to the quantity itersPerChunk, along with the quantity nextNumOfModels of proposed models 636 to be derived and tested in parallel in the following performance of such derivation and testing. The quantity of inliers W of the overall best proposed model derived and tested so far is initialized to 0.

Commencing execution of at least a portion of the logic of the control routine 540 with MSS_select, execution of the test preparation component 543 occurs with generation of a set of MSSs 533 of a quantity of 500, which are made available through the shared storage area 565 to enable execution of the control routine 640 by the processor component 650. As previously discussed, the controller 600 may be a graphics subsystem of the computing device 500, with the processor component 650 serving as a graphics processing unit (GPU) thereof. Further execution of at least some portions of the control routine 540 may await completion of the execution 640 to both derive and test up to 500 proposed models 636 in parallel.

Following such parallel derivation and testing of up to 500 proposed models 636, execution of a portion of the logic of the control routine 540 may resume with a call to findBestH implementing a portion of the logic of the comparison component 547. In preparation for execution, the quantity previousW of inliers associated with the overall best proposed model M is initialized to the current quantity W, and the index i is initialized to 0. The index i is used to control the iterative comparison of the quantity of inliers $W_1$ associated with each proposed models 636 of the new set of proposed models 636 to the quantity W of inliers associated with the overall best proposed model M. More precisely, where there are 500 proposed models 636 in a new set of proposed models 636 just derived and tested, i iterates from 0 to 499 to cause the comparison of W to every $W_i$.

If, as a result of such comparisons, one of the proposed models 636 of the new set of proposed models 636 is found to have a greater quantity of inliers $W_i$ than the quantity of inliers W associated with the overall best proposed model M, then that proposed model 636 of the new set becomes the new overall best proposed model M. Accordingly, the quantity W is updated to the quantity $W_i$, and the quantity K is recalculated (set to newK) in light of the new quantity W of inliers.

Regardless of whether the quantity K of proposed models 636 required to determine an accurate model is updated as a result of there being a new overall best proposed model M, or not, the quantity leftIters of proposed models 636 that remain to be derived and tested to reach the quantity K is updated. If the quantity leftIters falls to 0 as a result of being updated (it should be noted that leftIters is explicitly prevented from falling below 0), then further performance of RANSAC ceases, and the current overall best proposed model M is deemed to be the accurate model derived via RANSAC.

However, if the quantity leftIters has not yet fallen to 0 as a result of being updated, then the quantity nextNumOfModels indicating the quantity of proposed models 636 to be derived and tested in the next set of proposed models 636 is recalculated. If the quantity leftIters is at 500 or above after being updated, then the quantity nextNumOfModels remains set to its initial value of 500, indicating that the next new set of proposed models 636 is to include a quantity of 500 proposed models 636. However, if the quantity leftIters falls below 500 after being updated, then the quantity nextNumOfModels is set to a value less than 500 to cause only the quantity of proposed models 636 needed to reach the quantity K to next be derived and tested.

Figure 9:
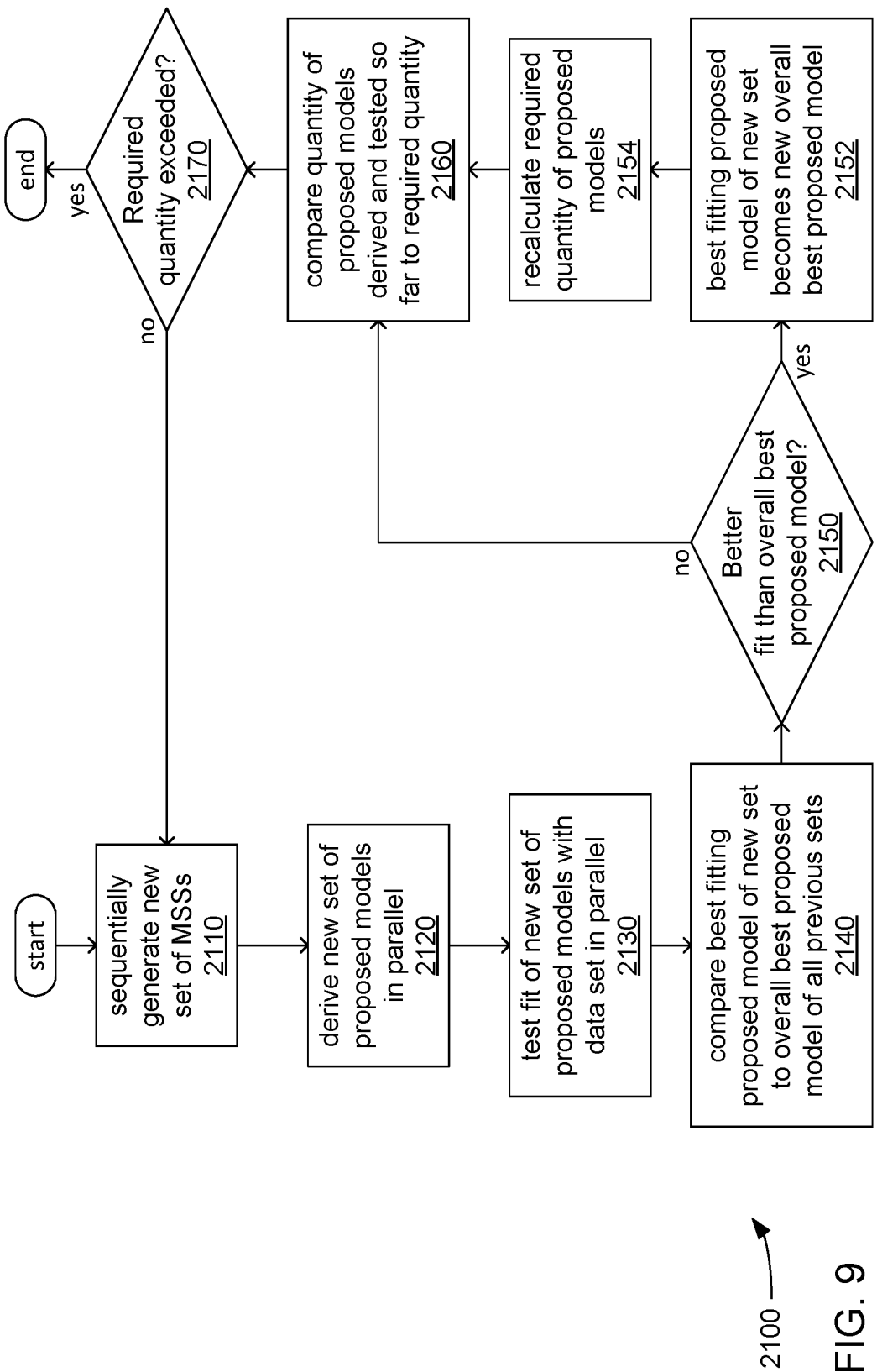

FIG. 9 illustrates one embodiment of a logic flow 2100. The logic flow 2100 may be representative of some or all of the operations executed by one or more embodiments described herein. More specifically, the logic flow 2100 may illustrate operations performed by the processor components 550 and/or 650 in executing at least the control routines 540 and 640, and/or performed by other component(s) of the computing device 500 or the controller 600, respectively.

At 2110, a processor component of a computing device (e.g., the processor component 550 of the computing device 500) sequentially generates a new set of MSSs from a data set. As has been discussed, the quantity of MSSs in a set of MSSs may be selected to match the quantity of proposed models to be generated in parallel in a new set of proposed models.

At 2120, at least one core of the same and/or one or more other processor components (e.g., one or more cores 651 of the processor component 550s and/or 650) generates the new set of proposed models in parallel from the new set of MSSs and an indication of one or more characteristics of the proposed models (e.g., a format of the proposed models that may be indicated in the model characteristics 531). As has been discussed, communications among processor components and/or cores of processor components involved in performing portions of RANSAC may be through use of a cache and/or a shared storage space that is cached by the cache (e.g., the cache 555 and/or the shared storage space 565).

At 2130, the new set of proposed models is tested in parallel to determine the degree of fit of each of the proposed models in the new set with the data elements of the data set. For each proposed model, a fit threshold may be employed to determine which data elements of the data set are inliers of that proposed model (and therefore, are in its consensus set), and which are outliers of that proposed model.

At 2140, a determination is made of which of the proposed models of the new set best fits the data set. Then a determination is made as to whether that best fitting of the proposed models of the new set fits the data set better than an overall best proposed model that fits the data set best out of all of the proposed models of all of the previously derived and tested sets of proposed models. As previously discussed, the degree of fit for each proposed model may be based on how many data elements of the data set are inliers of the consensus set of the proposed model, with the proposed model having a consensus set with a greater quantity of inliers deemed to be a better fit.

At 2150, if the best fitting proposed model of the new set of proposed models is a better fit than the overall best proposed model of all previous sets of proposed models, then the best fitting proposed model of the new set becomes the new overall best proposed model at 2152. Following this change in the overall best proposed model, the quantity of models required to be derived and tested to determine an accurate model with a predetermined degree of certainty is recalculated at 2154.

Regardless of whether or not the overall best proposed model is changed and the quantity of proposed models required to be derived and tested is recalculated, at 2160, the quantity of proposed models derived and tested so far is compared to that required quantity of proposed models to determine whether the required quantity has been exceeded by the quantity derived and tested so far. If not, then the generation of another set of MSSs and the derivation and testing of another set of proposed models is performed.

Figure 10:
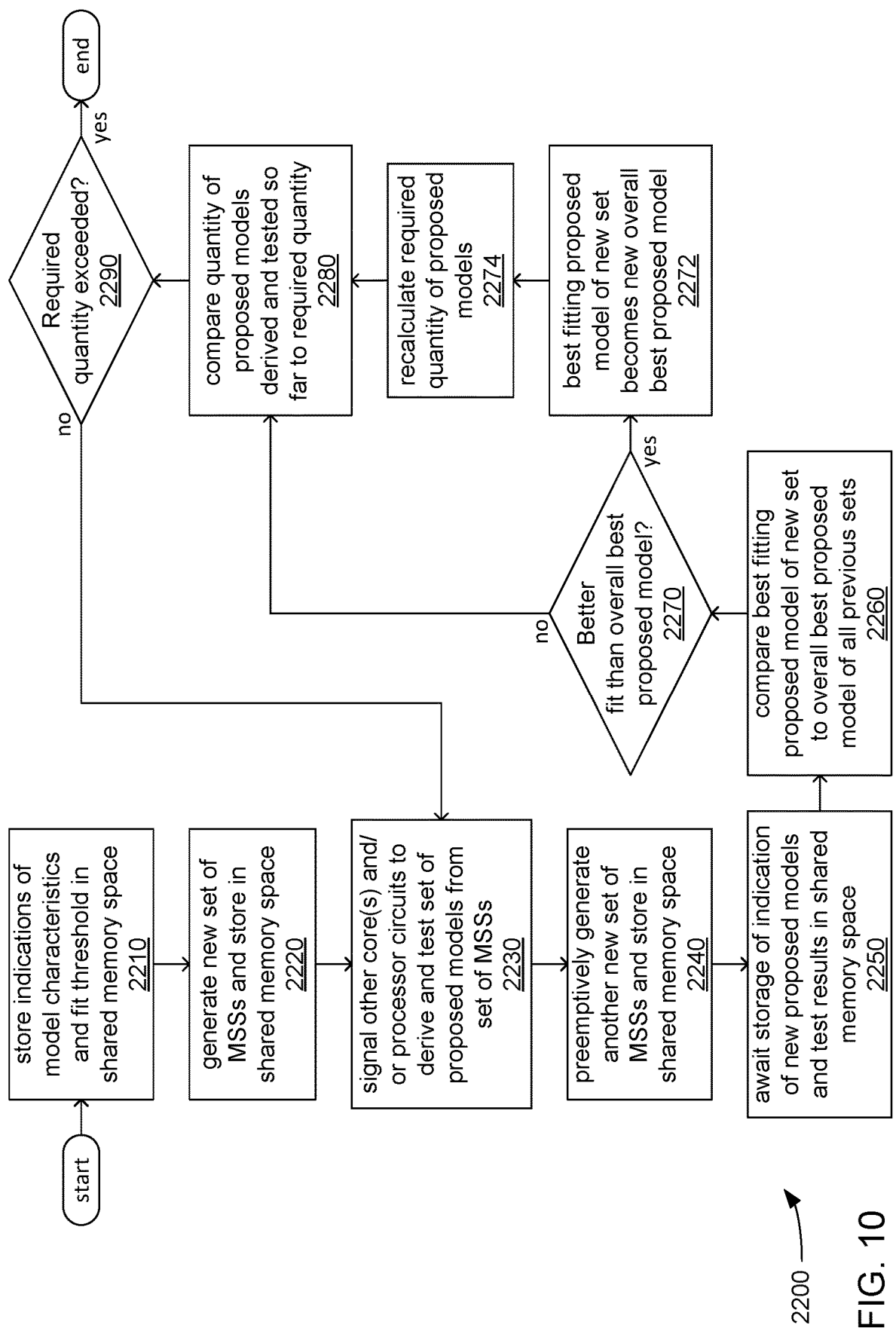
FIG. 10 illustrates a processing architecture according to an embodiment.

FIG. 10 illustrates one embodiment of a logic flow 2200. The logic flow 2200 may be representative of some or all of the operations executed by one or more embodiments described herein. More specifically, the logic flow 2200 may illustrate operations performed by the processor component 550 in executing at least the control routine 540, and/or performed by other component(s) of the computing device 500.

At 2210, a processor component of a computing device (e.g., the processor component 550 of the computing device 500) stores indications of characteristics of proposed models and threshold of fit to a data set in a shared memory space. Again, communications among processor components and/or cores of processor components involved in performing portions of RANSAC may be through use of a cache and/or a shared storage space that is cached by the cache (e.g., the cache 555 and/or the shared storage space 565).

At 2220, the processor component sequentially generates a new set of MSSs from a data set. As has been discussed, the quantity of MSSs in a set of MSSs may be selected to match the quantity of proposed models to be generated in parallel in a new set of proposed models. Again, the quantity of MSSs in a set of MSSs may be selected to match the quantity of proposed models to be generated in parallel in a new set of proposed models. At least one core of the same and/or one or more other processor components (e.g., one or more cores 651 of the processor component 550s and/or 650) is signaled to derive and test the new set of proposed models in parallel from the new set of MSSs at 2230.

At 2240, the processor component preemptively and sequentially generates another new set of MSSs from the data set. As previously discussed, although it is speculative as to whether this other new set of MSSs will actually be used, such preemptive generation of another new set of MSSs brings another degree of parallelism to the performance of RANSAC, thereby further reducing its execution time. At 2250, the processor component awaits storage of indications of the specifications of the proposed models of the new set of proposed models and test results of testing the degree of fit of each of the proposed models of the new set of proposed models to the data set.

At 2260, a determination is made of which of the proposed models of the new set best fits the data set. Then a determination is made as to whether that best fitting of the proposed models of the new set fits the data set better than an overall best proposed model that fits the data set best out of all of the proposed models of all of the previously derived and tested sets of proposed models. Again, the degree of fit for each proposed model may be based on how many data elements of the data set are inliers of the consensus set of the proposed model, with the proposed model having a consensus set with a greater quantity of inliers deemed to be a better fit.

At 2270, if the best fitting proposed model of the new set of proposed models is a better fit than the overall best proposed model of all previous sets of proposed models, then the best fitting proposed model of the new set becomes the new overall best proposed model at 2272. Following this change in the overall best proposed model, the quantity of models required to be derived and tested to determine an accurate model with a predetermined degree of certainty is recalculated at 2274.

Regardless of whether or not the overall best proposed model is changed and the quantity of proposed models required to be derived and tested is recalculated, at 2280, the quantity of proposed models derived and tested so far is compared to that required quantity of proposed models to determine whether the required quantity has been exceeded by the quantity derived and tested so far. If not, then the at least one core of the same and/or one or more other processor components is signaled to derive and test another new set of proposed models in parallel from the other new set of MSSs at 2230.

Figure 11:
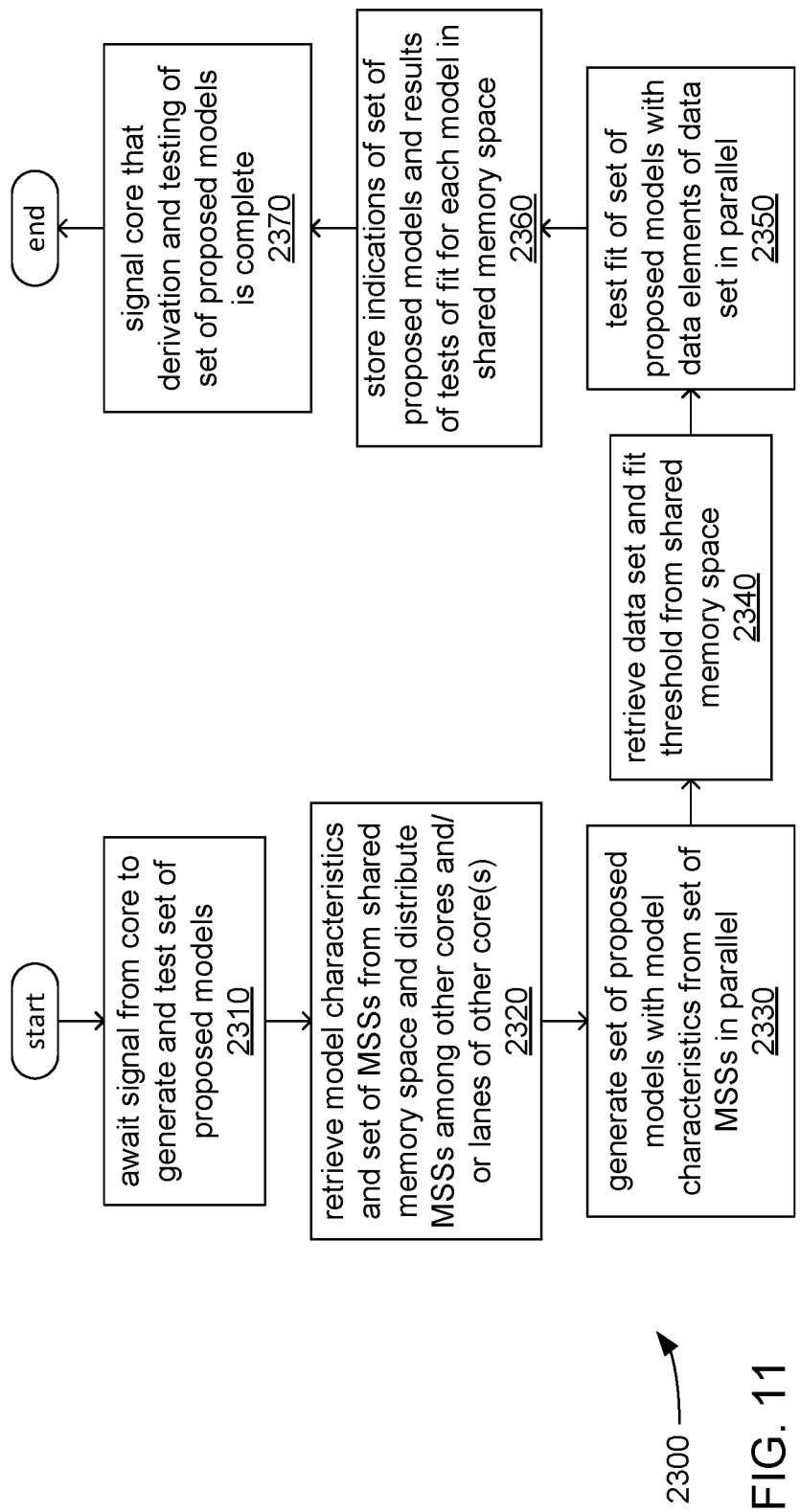
FIG. 11 illustrates another alternate embodiment of a graphics processing system.

FIG. 11 illustrates one embodiment of a logic flow 2300. The logic flow 2300 may be representative of some or all of the operations executed by one or more embodiments described herein. More specifically, the logic flow 2300 may illustrate operations performed by the processor component 550 or 650 in executing at least the control routine 640, and/or performed by other component(s) of the computing device 500 or the controller 600, respectively.

At 2310, a processor component of a computing device (e.g., the processor component 550 of the computing device 500, or the processor component 650 of the controller 600) awaits a signal from a core of the same or a different processor component to derive and test a new set of proposed models from a new set of MSSs stored in a shared memory space. Again, communications among processor components and/or cores of processor components involved in performing portions of RANSAC may be through use of a cache and/or a shared storage space that is cached by the cache (e.g., the cache 555 and/or the shared storage space 565).

At 2320, the processor component retrieves the indication of characteristics of the proposed models (e.g., a format of the proposed models that may be indicated in the model characteristics 531) and the new set of MSSs from the shared memory space. Again, the quantity of MSSs in a set of MSSs may be selected to match the quantity of proposed models to be generated in parallel in a new set of proposed models. At 2330, at least one core of the processor component (e.g., at least one core 651 of the processor component 550s and/or 650) generates the new set of proposed models in parallel from the new set of MSSs and the indication of one or more characteristics of the proposed models.

At 2340, the processor component retrieves the data set from which the MSSs were generated and an indication of a fit threshold from the shared memory space. At 2350, the at least one core of the processor component tests the new set of proposed models of the new set of proposed models for degree of fit with the data elements of the data set. For each proposed model, a fit threshold may be employed to determine which data elements of the data set are inliers of that proposed model (and therefore, are in its consensus set), and which are outliers of that proposed model.

At 2360, the processor component stores indications of specifications of each of the proposed models of the new set of proposed models and indications of the results of the testing of each in the shared memory space. Again, the indications of test results may include an indication of how many inliers are within the consensus set of each of the proposed models of the new set of proposed models. At 2370, another core of the same or a different processor component is signaled with an indication that derivation and testing of the new set of proposed models is complete.

Figure 12:
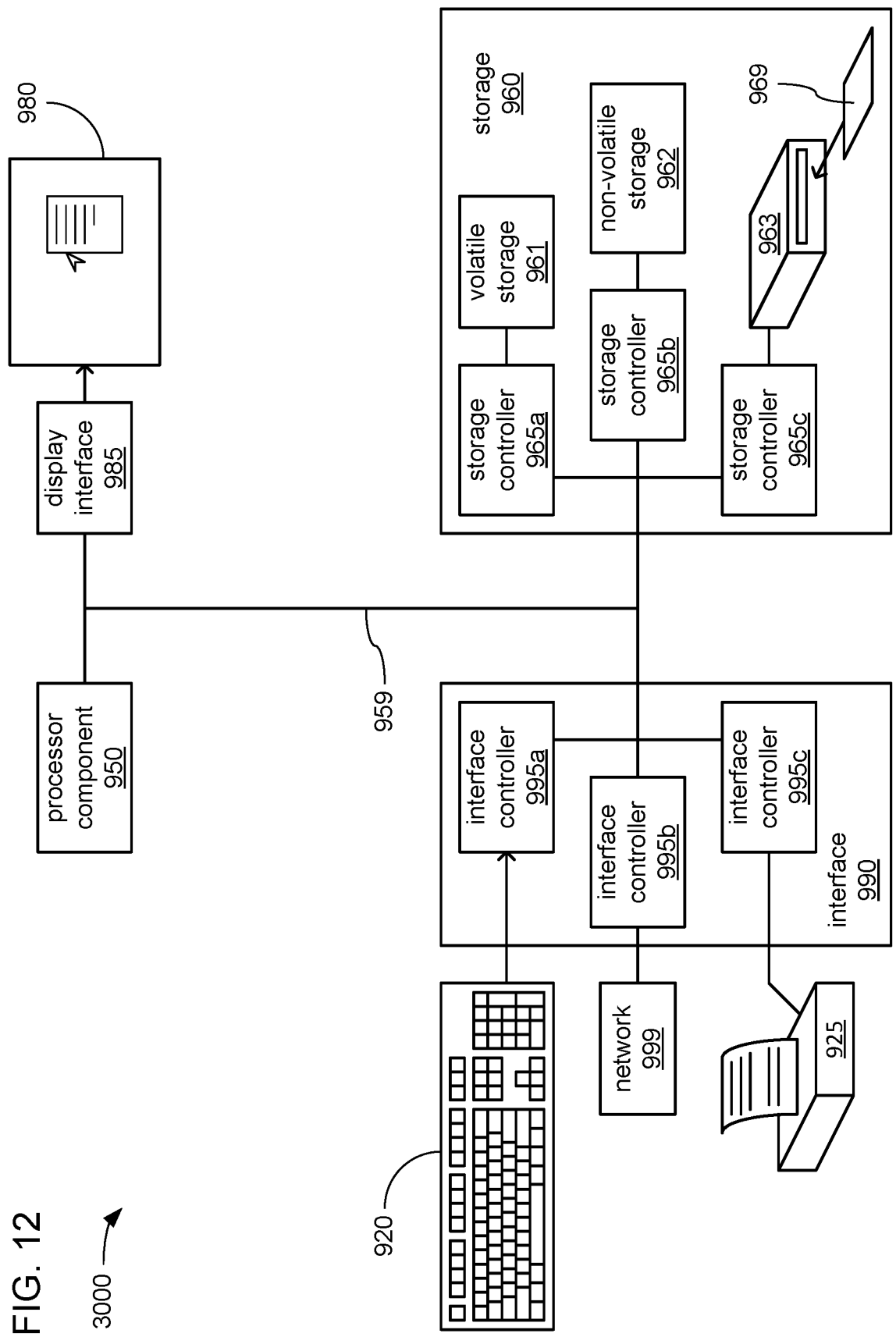
FIG. 12 illustrates an embodiment of a device.

FIG. 12 illustrates an embodiment of an exemplary processing architecture 3000 suitable for implementing various embodiments as previously described. More specifically, the processing architecture 3000 (or variants thereof) may be implemented as part of one or more of the computing devices 100, 300, 500 or 700, and/or as part of the controller 600. It should be noted that components of the processing architecture 3000 are given reference numbers in which the last two digits correspond to the last two digits of reference numbers of at least some of the components earlier depicted and described as part of the computing devices 100, 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 550 and 650) may include any of a wide variety of commercially available processors, employing any of a wide variety of technologies and implemented with one or more cores physically combined in any of a number of ways.

As previously discussed, the storage 960 (corresponding to the storages 560 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interface 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Figure 13:
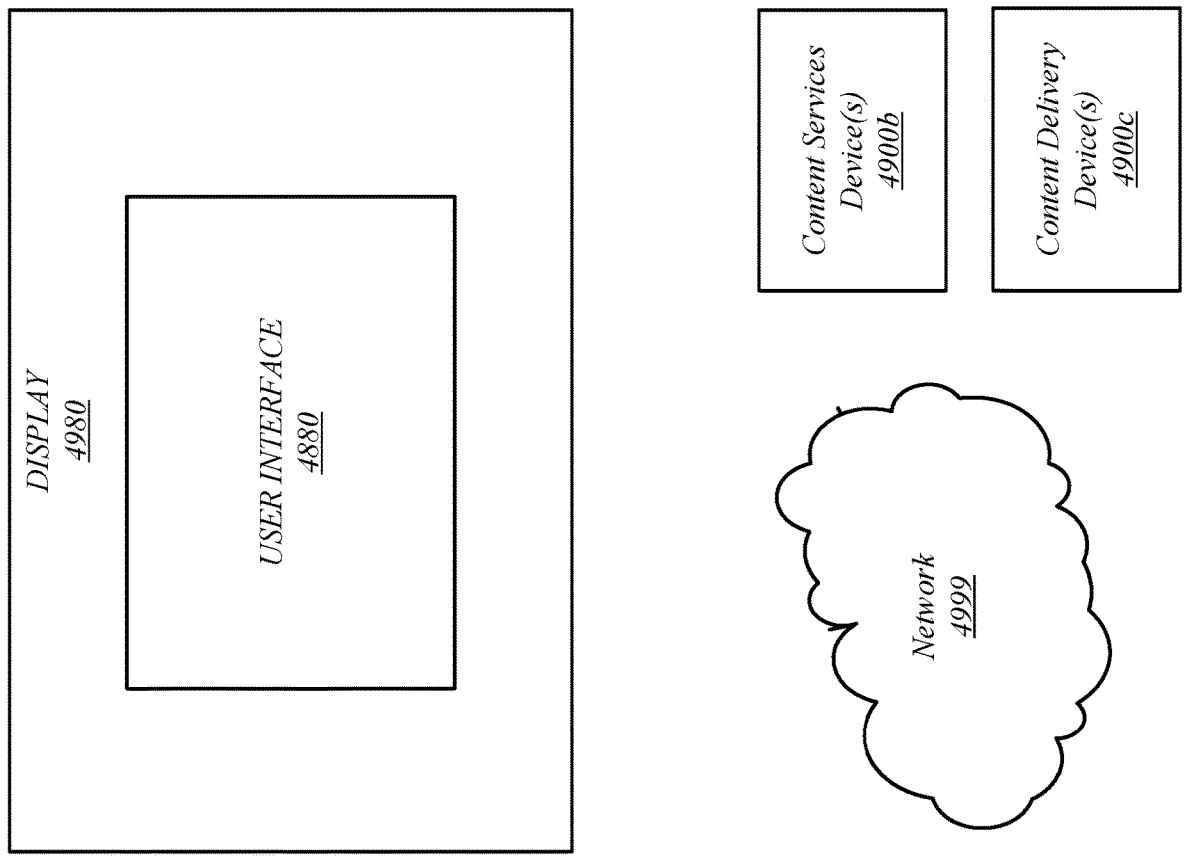
FIG. 13 illustrates an embodiment of a system.
Figure 13:
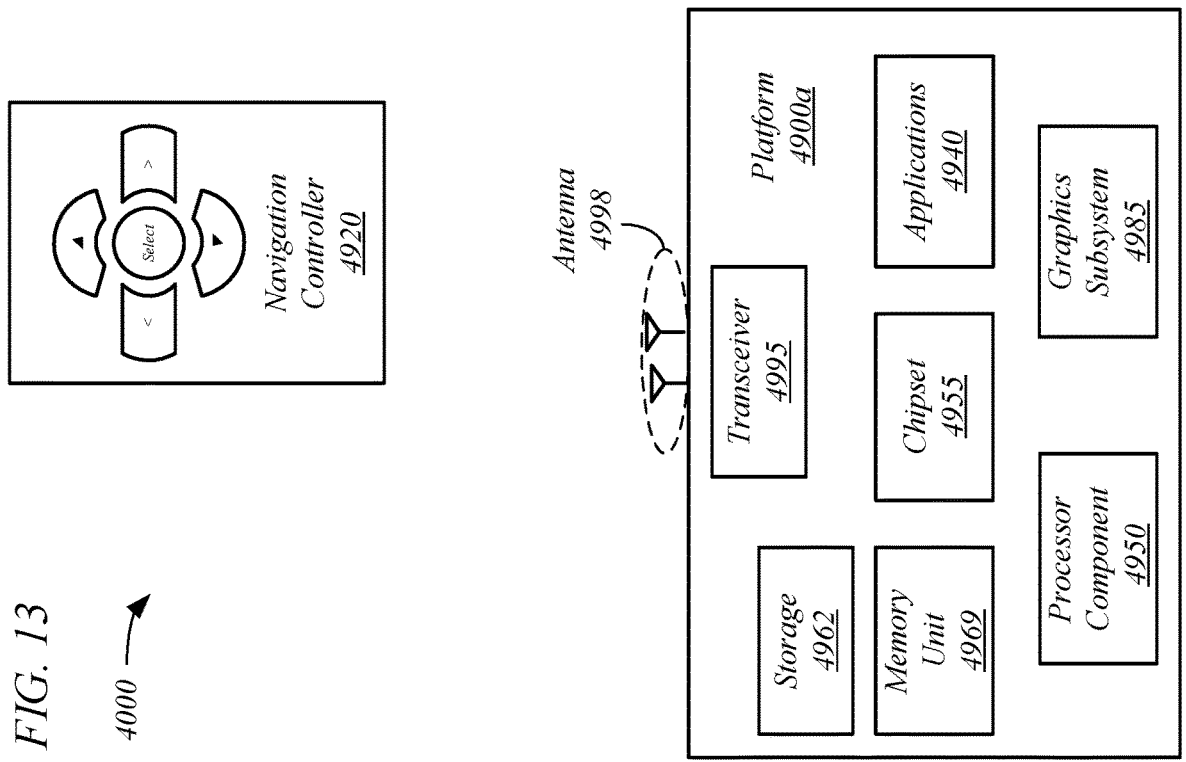

FIG. 13 illustrates an embodiment of a system 4000. In various embodiments, system 4000 may be representative of a system or architecture suitable for use with one or more embodiments described herein, such as the system 1000; one or more of the computing devices 100, 300, 500 or 700; and/or one or more of the logic flows 2100, 2200 or 2300. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 13 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to one or more of processor components 550 or 650, and/or to processor component 950 of FIG. 12.

Memory unit 4969 may be implemented using any machine-readable or computer-readable media capable of storing data, and may be the same as or similar to storage media 969 of FIG. 12.

Transceiver 4995 may include one or more radios capable of transmitting and receiving signals using various suitable wireless communications techniques, and may be the same as or similar to transceiver 995b in FIG. 12.

Display 4980 may include any television type monitor or display, and may be the same as or similar to one or more of displays 380 and 680, and/or to display 980 in FIG. 12.

Storage 4962 may be implemented as a non-volatile storage device, and may be the same as or similar to non-volatile storage 962 in FIG. 12.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900b may be hosted by any national, international and/or independent service and thus accessible to platform 4900a via the Internet, for example. Content services device(s) 4900b may be coupled to platform 4900a and/or to display 4980. Platform 4900a and/or content services device(s) 4900b may be coupled to a network 4999 to communicate (e.g., send and/or receive) media information to and from network 4999. Content delivery device(s) 4900c also may be coupled to platform 4900a and/or to display 4980.

In embodiments, content services device(s) 4900b may include a cable television box, personal computer, network, telephone, Internet enabled devices or appliance capable of delivering digital information and/or content, and any other similar device capable of unidirectionally or bidirectionally communicating content between content providers and platform 4900a and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900b receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900a and/or display 4980. Embodiments, however, are not limited to the elements or in the context shown or described herein.

In embodiments, drivers (not shown) may include technology to enable users to instantly turn on and off platform 4900a like a television with the touch of a button after initial boot-up, when enabled, for example. Program logic may allow platform 4900a to stream content to media adaptors or other content services device(s) 4900b or content delivery device(s) 4900c when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900a and content services device(s) 4900b may be integrated, or platform 4900a and content delivery device(s) 4900c may be integrated, or platform 4900a, content services device(s) 4900b, and content delivery device(s) 4900c may be integrated, for example. In various embodiments, platform 4900a and display 4890 may be an integrated unit. Display 4980 and content service device(s) 4900b may be integrated, or display 4980 and content delivery device(s) 4900c may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth.

When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
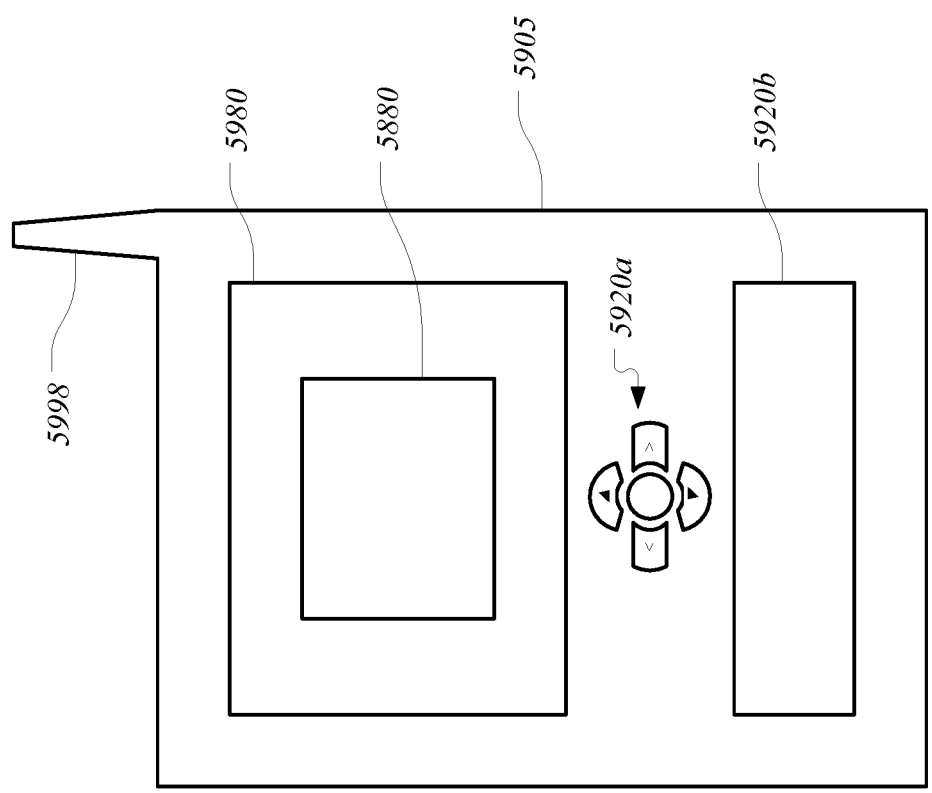
FIG. 14 illustrates embodiments of a small form factor device.

As described above, system 4000 may be embodied in varying physical styles or form factors. FIG. 14 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 13. Navigation controller 5920a may include one or more navigation features which may be used to interact with user interface 5880, and may be the same as or similar to navigation controller 4920 in FIG. 13. I/O device 5920b may include any suitable I/O device for entering information into a mobile computing device. Examples for I/O device 5920b may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, a device to perform random sample and consensus (RANSAC) includes a derivation component to derive multiple proposed models of a new set of proposed models in parallel from a set of minimal sample sets (MSSs) of a data set; and a comparison component to recalculate a required quantity of proposed models to derive an accurate model within a selected degree of certainty if a proposed model of the new set better fits the data set than any previously derived proposed model, and to determine whether to derive another new set of proposed models based on a comparison of the required quantity to a quantity of proposed models already derived.

In Example 2, which includes the subject matter of Example 1, the device may include a testing component to test a degree of fit of each proposed model of the new set of proposed models to the data set in parallel, and the testing component may determine how many data elements of the data set are inliers of a consensus set of each proposed model of the new set based on how many data elements fit each proposed model of the new set within a selected fit threshold.

In Example 3, which includes the subject matter of any of Examples 1-2, the comparison component may recalculate the required quantity based on a quantity of inliers in the consensus set of the proposed model of the new set that better fits the data set than any previously derived proposed model.

In Example 4, which includes the subject matter of any of Examples 1-3, the comparison component may store in a storage a specification of an overall best proposed model of all previously derived sets of proposed models that best fits the data set, and the device may include a selection component to replace the specification of the overall best proposed model in the storage with a specification of a proposed model of the new set that better fits the data set than the overall best proposed model.

In Example 5, which includes the subject matter of any of Examples 1-4, the device may include a minimal sample set (MSS) generator to generate the set of MSSs prior to derivation of the new set of proposed models to enable derivation of the new set of proposed models in parallel, and to generate another set of MSSs in parallel with derivation of the new set in preparation for derivation of the another new set of proposed models in parallel.

In Example 6, which includes the subject matter of any of Examples 1-5, the MSS generator may randomly select data elements of the data set to generate each MSS of the set of MSSs and each MSS of the other set of MSSs.

In Example 7, which includes the subject matter of any of Examples 1-6, the device may include a core to execute the MSS generator, at least one other core to execute the derivation component, and a cache to convey the set of MSSs between the core and the at least one other core.

In Example 8, which includes the subject matter of any of Examples 1-7, the device may include the core and the at least one other core.

In Example 9, which includes the subject matter of any of Examples 1-8, the at least one other core may include multiple cores, each core of the multiple cores may support at least one thread of execution, and the derivation component may derive each proposed model of the new set via a separate thread of execution on one of the multiple cores.

In Example 10, which includes the subject matter of any of Examples 1-9, the at least one other core may include a register set supporting single-instruction multiple-execution (SIMD) operations with multiple lanes, and the derivation component may derive each proposed model of the new set within a separate lane of the multiple lanes.

In Example 11, which includes the subject matter of any of Examples 1-10, the device may include a cache component to configure the cache to serve as a buffer between the core and the at least one other core.

In Example 12, which includes the subject matter of any of Examples 1-11, the device may include a storage accessible to the core and the at least one other core, and a shared storage space defined within the storage and at least partly cached by the cache, the MSS generator to store the set of MSSs and the other set of MSSs in the shared storage space and the derivation component to retrieve the set of MSSs from the shared storage space.

In Example 13, which includes the subject matter of any of Examples 1-12, the device may include at least one of a display to visually present an image based on the accurate model or an interface to transmit data associated with the accurate model to another device.

In Example 14, a device to perform random sample and consensus (RANSAC) includes a testing component to test a degree of fit of multiple proposed models of a new set of proposed models to a data set in parallel; and a comparison component to recalculate a required quantity of proposed models to derive an accurate model within a selected degree of certainty if a proposed model of the new set better fits the data set than any previously tested proposed model, and to determine whether to test another new set of proposed models based on a comparison of the required quantity to a quantity of proposed models already tested.

In Example 15, which includes the subject matter of Example 14, the device may include a derivation component to derive each proposed model of the new set of proposed models in parallel from a set of minimal sample sets (MSSs) of a data set.

In Example 16, which includes the subject matter of any of Examples 14-15, the comparison component may store in a storage a specification of an overall best proposed model of all previously tested sets of proposed models that best fits the data set, the device may include a selection component to replace the specification of the overall best proposed model in the storage with a specification of a proposed model of the new set that better fits the data set than the overall best proposed model.

In Example 17, which includes the subject matter of any of Examples 14-16, the device may include a minimal sample set (MSS) generator to generate the set of MSSs prior to testing of the new set of proposed models to enable derivation and testing of the new set of proposed models in parallel, and to generate another set of MSSs in parallel with testing of the new set in preparation for derivation and testing of the another new set of proposed models in parallel.

In Example 18, which includes the subject matter of any of Examples 14-17, the MSS generator may randomly select data elements of the data set to generate each MSS of the set of MSSs and each MSS of the other set of MSSs.

In Example 19, which includes the subject matter of any of Examples 14-18, the testing component may determine how many data elements of the data set are inliers of a consensus set of each proposed model of the new set based on how many data elements fit each proposed model of the new set within a selected fit threshold, and the comparison component may recalculate the required quantity based on a quantity of inliers in the consensus set of the proposed model of the new set that better fits the data set than any previously tested proposed model.

In Example 20, which includes the subject matter of any of Examples 14-19, the device may include a core to execute the comparison component, at least one other core to execute the testing component, and a cache to convey a set of consensus sets of the new set of proposed models between the core and the at least one other core.

In Example 21, which includes the subject matter of any of Examples 14-20, the processor component may include the core and the at least one other core.

In Example 22, which includes the subject matter of any of Examples 14-21, the at least one other core may include multiple cores, each core of the multiple cores supporting at least one thread of execution, and the testing component to test each proposed model of the new set via a separate thread of execution on one of the multiple cores.

In Example 23, which includes the subject matter of any of Examples 14-22, the at least one other core may include a register set supporting single-instruction multiple-execution (SIMD) operations with multiple lanes, and the testing component may test each proposed model of the new set within a separate lane of the multiple lanes.

In Example 24, which includes the subject matter of any of Examples 14-23, the device may include a cache component to configure the cache to serve as a buffer between the core and the at least one other core.

In Example 25, which includes the subject matter of any of Examples 14-24, the device may include a storage accessible to the core and the at least one other core; and a shared storage space defined within the storage and at least partly cached by the cache, the testing component to store the set of consensus sets in the shared storage space and the comparison component to retrieve the set of consensus sets from the shared storage space.

In Example 26, which includes the subject matter of any of Examples 14-25, the device may include at least one of a display to visually present an image based on the accurate model or an interface to transmit data associated with the accurate model to another device.

In Example 27, a computing-implemented method for performing random sample and consensus (RANSAC) includes deriving multiple proposed models of a new set of proposed models in parallel from a set of minimal sample sets (MSSs) of a data set, recalculating a required quantity of proposed models to derive an accurate model within a selected degree of certainty if a proposed model of the new set better fits the data set than any previously derived proposed model, and determining whether to derive another new set of proposed models based on a comparison of the required quantity to a quantity of proposed models already derived.

In Example 28, which includes the subject matter of Example 27, the method may include determining how many data elements of the data set are inliers of a consensus set of each proposed model of the new set based on how many data elements fit each proposed model of the new set within a selected fit threshold.

In Example 29, which includes the subject matter of any of Examples 27-28, the method may include recalculating the required quantity based on a quantity of inliers in the consensus set of the proposed model of the new set that better fits the data set than any previously derived proposed model.

In Example 30, which includes the subject matter of any of Examples 27-29, the method may include generating the set of MSSs prior to deriving the new set of proposed models to enable derivation of the new set of proposed models in parallel, and generating another set of MSSs in parallel with deriving the new set in preparation for deriving the another new set of proposed models in parallel.

In Example 31, which includes the subject matter of any of Examples 27-30, the method may include randomly selecting data elements of the data set to generate each MSS of the set of MSSs, and randomly selecting data elements of the data set to generate each MSS of the other set of MSSs.

In Example 32, which includes the subject matter of any of Examples 27-31, the method may include generating the set of MSSs and the other set of MSSs on one core, and deriving the new set of proposed models on at least one other core.

In Example 33, which includes the subject matter of any of Examples 27-32, the at least one other core may include multiple cores, each core of the multiple cores may support at least one thread of execution, and the method may include deriving each proposed model of the new set via a separate thread of execution on one of the multiple cores.

In Example 34, which includes the subject matter of any of Examples 27-33, the at least one other core may include a register set supporting single-instruction multiple-execution (SIMD) operations with multiple lanes, and the method may include derive each proposed model of the new set within a separate lane of the multiple lanes.

In Example 35, which includes the subject matter of any of Examples 27-34, the method may include configuring a cache to serve as a buffer between the core and the at least one other core.

In Example 36, which includes the subject matter of any of Examples 27-35, the method may include defining a shared storage space in a storage accessible to the core and to the at least one other core, configuring a cache to at least partly cache the shared storage space, and storing the set of MSSs and the other set of MSSs in the shared storage space.

In Example 37, which includes the subject matter of any of Examples 27-36, the method may include at least one of visually presenting an image based on the accurate model or transmitting data associated with the accurate model to another device.

In Example 38, at least one machine-readable storage medium includes instructions that when executed by a computing device, cause the computing device to derive multiple proposed models of a new set of proposed models in parallel from a set of minimal sample sets (MSSs) of a data set, recalculate a required quantity of proposed models to derive an accurate model within a selected degree of certainty if a proposed model of the new set better fits the data set than any previously derived proposed model, and determine whether to derive another new set of proposed models based on a comparison of the required quantity to a quantity of proposed models already derived.

In Example 39, which includes the subject matter of Example 38, the computing device may be caused to determine how many data elements of the data set are inliers of a consensus set of each proposed model of the new set based on how many data elements fit each proposed model of the new set within a selected fit threshold.

In Example 40, which includes the subject matter of any of Examples 38-39, the computing device may be caused to recalculate the required quantity based on a quantity of inliers in the consensus set of the proposed model of the new set that better fits the data set than any previously derived proposed model.

In Example 41, which includes the subject matter of any of Examples 38-40, the computing device may be caused to generate the set of MSSs prior to deriving the new set of proposed models to enable derivation of the new set of proposed models in parallel, and generate another set of MSSs in parallel with deriving the new set in preparation for deriving the another new set of proposed models in parallel.

In Example 42, which includes the subject matter of any of Examples 38-41, the computing device may be caused to randomly select data elements of the data set to generate each MSS of the set of MSSs, and randomly select data elements of the data set to generate each MSS of the other set of MSSs.

In Example 43, which includes the subject matter of any of Examples 38-42, the computing device may be caused to generate the set of MSSs and the other set of MSSs on one core of the computing device, and derive the new set of proposed models on at least one other core of the computing device.

In Example 44, which includes the subject matter of any of Examples 38-43, the at least one other core may include multiple cores, each core of the multiple cores may support at least one thread of execution, and the computing device may be caused to derive each proposed model of the new set via a separate thread of execution on one of the multiple cores.

In Example 45, which includes the subject matter of any of Examples 38-44, the at least one other core may include a register set supporting single-instruction multiple-execution (SIMD) operations with multiple lanes, and the computing device may be caused to derive each proposed model of the new set within a separate lane of the multiple lanes.

In Example 46, which includes the subject matter of any of Examples 38-45, the computing device may be caused to configure a cache of the computing device to serve as a buffer between the core and the at least one other core.

In Example 47, which includes the subject matter of any of Examples 38-46, the computing device may be caused to define a shared storage space in a storage accessible to the core and to the at least one other core, configure a cache to at least partly cache the shared storage space, and store the set of MSSs and the other set of MSSs in the shared storage space.

In Example 48, which includes the subject matter of any of Examples 38-47, the computing device may be caused to transmit data associated with the accurate model to another device.

In Example 49, at least one machine-readable storage medium may include instructions that when executed by a computing device, cause the computing device to perform any of the above.

In Example 50, a device to perform random sample and consensus (RANSAC) may include means for performing any of the above.

The invention claimed is:

1. A system comprising:
one or more first processor cores configured to:
generate a first set of minimal sample sets (MSSs), each MSS of the first set to include a random selection of data elements of a data set;
interface circuitry to:
transmit a signal from the one or more first processor cores to one or more second processor cores to cause the one or more second processor cores to derive a first set of proposed models in parallel from the first set of MSSs, each model of the first set of proposed models corresponding to an MSS of the first set of MSSs;
wherein the one or more first processor cores are further configured to:
generate a second set of MSSs in parallel with the derivation of the first set of proposed models by the one or more second processor cores,
if a proposed model of the first set of proposed models better fits the data set than a previous best fit model:
store a specification of the proposed model with better fit, and
recalculate a quantity of proposed models to derive; and
determine whether to derive a second set of proposed models from the second set of MSSs following derivation of the first set of proposed models based on a comparison of the quantity to a quantity of previously derived proposed models, wherein the quantity of previously derived proposed models includes the first set of proposed models.

2. The system of claim 1, wherein the one or more second processor cores are configured to determine a degree of fit of each proposed model of the first set of proposed models to the data set in parallel, the degree of fit based on how many data elements of the data set fit each proposed model of the first set of proposed models within a selected fit threshold.

3. The system of claim 1, comprising:
a cache to store the first set of MSSs, wherein the cache is accessible by the one or more first processor cores and the one or more second processor cores.

4. The system of claim 3, wherein the cache is configurable to serve as a buffer between the one or more first processor cores and the one or more second processor cores.

5. The system of claim 1, further comprising:
the one or more second processor cores.

6. The system of claim 1, further comprising:
a shared memory to store the first set of MSSs and the second set of MSSs, the shared memory accessible by the one or more first processor cores and the one or more second processor cores.

7. The system of claim 1, wherein:
the one or more first processor cores include a central processing unit (CPU) core; and the one or more second processor cores include multiple graphics processing unit (GPU) cores.

8. A computer-implemented method for performing random sample and consensus (RANSAC) comprising:
generating a first set of minimal sample sets (MSSs) from a data set with one or more first processor cores, each MSS of the first set to include a random selection of data elements of the data set;
transmitting a signal from the one or more first processor cores to one or more second processor cores to cause the one or more second processor cores to derive a first set of proposed models in parallel from the first set of MSSs;
generating a second set of MSSs in parallel with the derivation of the first set of proposed models by the one or more second processor cores;
in response to a determination that a proposed model of the first set of proposed models better fits the data set than a previous best fit model:
storing a specification of the proposed model with better fit, and
recalculating a quantity of proposed models to derive; and
determining whether to derive a second set of proposed models from the second set of MSSs following derivation of the first set of proposed models based on a comparison of the quantity to a quantity of previously derived proposed models, wherein the quantity of previously derived proposed models includes the first set of proposed models.

9. The computer-implemented method of claim 8, comprising determining how many data elements of the data set are inliers of a consensus set of each proposed model of the first set based on how many data elements of the data set fit each proposed model of the first set within a selected fit threshold.

10. The computer-implemented method of claim 9, comprising recalculating the quantity based on a quantity of inliers in a consensus set of a proposed model of the first set of proposed models exceeding a quantity of inliers in a consensus of any proposed model derived prior to derivation of the first set of proposed models.

11. The computer-implemented method of claim 8, comprising:
randomly selecting data elements of the data set to generate each MSS of the first set of MSSs; and
randomly selecting data elements of the data set to generate each MSS of the second set of MSSs.

12. The computer-implemented method of claim 8, comprising at least one of visually presenting an image based on the specification of the proposed model with the better fit or transmitting data associated with the proposed model with the better fit to another device.

13. The computer-implemented method of claim 8, further comprising:
storing the first set of MSSs and the second set of MSSs to a shared memory, the shared memory accessible by the one or more first processor cores and the one or more second processor cores.

14. The computer-implemented method of claim 8, wherein:
the one or more first processor cores include a central processing unit (CPU) core; and
the one or more second processor cores include multiple graphics processing unit (GPU) cores.

15. At least one machine-readable non-transitory storage medium comprising instructions that when executed by a computing device, cause the computing device to:
generate a first set of minimal sample sets (MSSs from a data set, each MSS of the first set to include a random selection of data elements of the data set;
transmit a signal from one or more first processor cores to one or more second processor cores to cause the one or more second processor cores to derive a first set of proposed models in parallel from the first set of MSSs;
generate a second set of MSSs in parallel with the derivation of the first set of proposed models by the one or more second processor cores;
in response to a determination that a proposed model of the first set of proposed models better fits the data set than a previous best fit model:
store a specification of the proposed model with better fit, and
recalculate a quantity of proposed models to derive; and
determine whether to derive a second set of proposed models from the second set of MSSs following derivation of the first set of proposed models based on a comparison of the quantity to a quantity of previously derived proposed models, wherein the quantity of previously derived proposed models includes the first set of proposed models.

16. The at least one machine-readable storage medium of claim 15, the instructions to cause the computing device to: determine how many data elements of the data set are inliers of a consensus set of each proposed model of the first set based on how many data elements of the data set fit each proposed model of the first set within a selected fit threshold.

17. The at least one machine-readable storage medium of claim 15, the instructions to cause the computing device to: recalculate the quantity based on a quantity of inliers in a consensus set of a proposed model of the first set of proposed models exceeding a quantity of inliers in a consensus of any proposed model derived prior to derivation of the first set of proposed models.

18. The at least one machine-readable storage medium of claim 15, the instructions to cause the computing device to: configure a cache of the computing device to serve as a buffer between the one or more first processor cores and the one or more second processor cores.

19. The at least one machine-readable storage medium of claim 15, the instructions to cause the computing device to:
define a shared storage space in a storage accessible to the one or more first processor cores and to the one or more second processor cores;
configure a cache to at least partly cache the shared storage space; and
store the first set of MSSs and the second set of MSSs in the shared storage space.

20. The at least one machine-readable storage medium of claim 15, wherein:
the one or more first processor cores include a central processing unit (CPU) core; and
the one or more second processor cores include multiple graphics processing unit (GPU) cores.

\* \* \* \* \*